(12) United States Patent
Torbatian et al.

(10) Patent No.: US 11,502,756 B2
(45) Date of Patent: Nov. 15, 2022

(54) DATA SYNCHRONIZATION IN OPTICAL NETWORKS AND DEVICES

(71) Applicant: Infinera Corporation, Sunnyvale, CA (US)

(72) Inventors: Mehdi Torbatian, Ottawa (CA); Yuliang Gao, Ottawa (CA); Ahmed Morra, Ottawa (CA); Han Henry Sun, Ottawa (CA); Yeongho Park, Palo Alto, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/134,144

(22) Filed: Dec. 24, 2020

(65) Prior Publication Data

US 2022/0052765 A1 Feb. 17, 2022

Related U.S. Application Data

(60) Provisional application No. 63/043,098, filed on Jun. 23, 2020.

(51) Int. Cl.
*H04B 10/00* (2013.01)
*H04B 10/61* (2013.01)
*H04B 10/516* (2013.01)
*H04L 7/00* (2006.01)
*H04L 69/22* (2022.01)
*H04L 25/03* (2006.01)
*H04B 10/079* (2013.01)
*H04B 10/2575* (2013.01)
*H04L 27/00* (2006.01)
*H04L 1/16* (2006.01)
*H04L 27/26* (2006.01)

(52) U.S. Cl.
CPC ... *H04B 10/6164* (2013.01); *H04B 10/07951* (2013.01); *H04B 10/25759* (2013.01); *H04B 10/516* (2013.01); *H04L 1/1657* (2013.01); *H04L 7/0075* (2013.01); *H04L 25/03305* (2013.01); *H04L 25/03331* (2013.01); *H04L 27/0014* (2013.01); *H04L 27/2662* (2013.01); *H04L 69/22* (2013.01); *H04B 10/6161* (2013.01); *H04L 2027/0026* (2013.01)

(58) Field of Classification Search
CPC .......... H04B 10/6164; H04L 25/03305; H04L 25/03331
USPC ....................................................... 398/130
See application file for complete search history.

(56) References Cited

U.S. PATENT DOCUMENTS 8,149,948 B2 * 4/2012 Song ................ H03M 13/2921
375/295
8,208,499 B2 * 6/2012 Sun .................... H04L 27/2272
370/278

(Continued)

*Primary Examiner* — Don N Vo
(74) *Attorney, Agent, or Firm* — David L. Soltz

(57) ABSTRACT

Joint estimation of the framer index and the frequency offset in an optical communication system are described among various other features. A transmitter can transmit data frames using pilot and framer symbols. A receiver can estimate the framer index and frequency offset using the pilot and framer symbols, and identify the beginning of a header portion of a data frame. By identifying the beginning of the header portion of a data frame, the receiver can then process data received from the transmitter in a manner synchronous to the manner in which the data was transmitted by the transmitter.

21 Claims, 23 Drawing Sheets

(56) References Cited

U.S. PATENT DOCUMENTS

| | | | | |
|---|---|---|---|---|
| 2011/0170015 A1* | 7/2011 | Kim | .................... | H04N 21/426 |
| | | | | 348/731 |
| 2011/0274204 A1* | 11/2011 | Ko | ........................ | H04L 69/22 |
| | | | | 375/295 |
| 2012/0076198 A1* | 3/2012 | Hong | ................ | H04N 21/2383 |
| | | | | 375/E7.026 |

\* cited by examiner

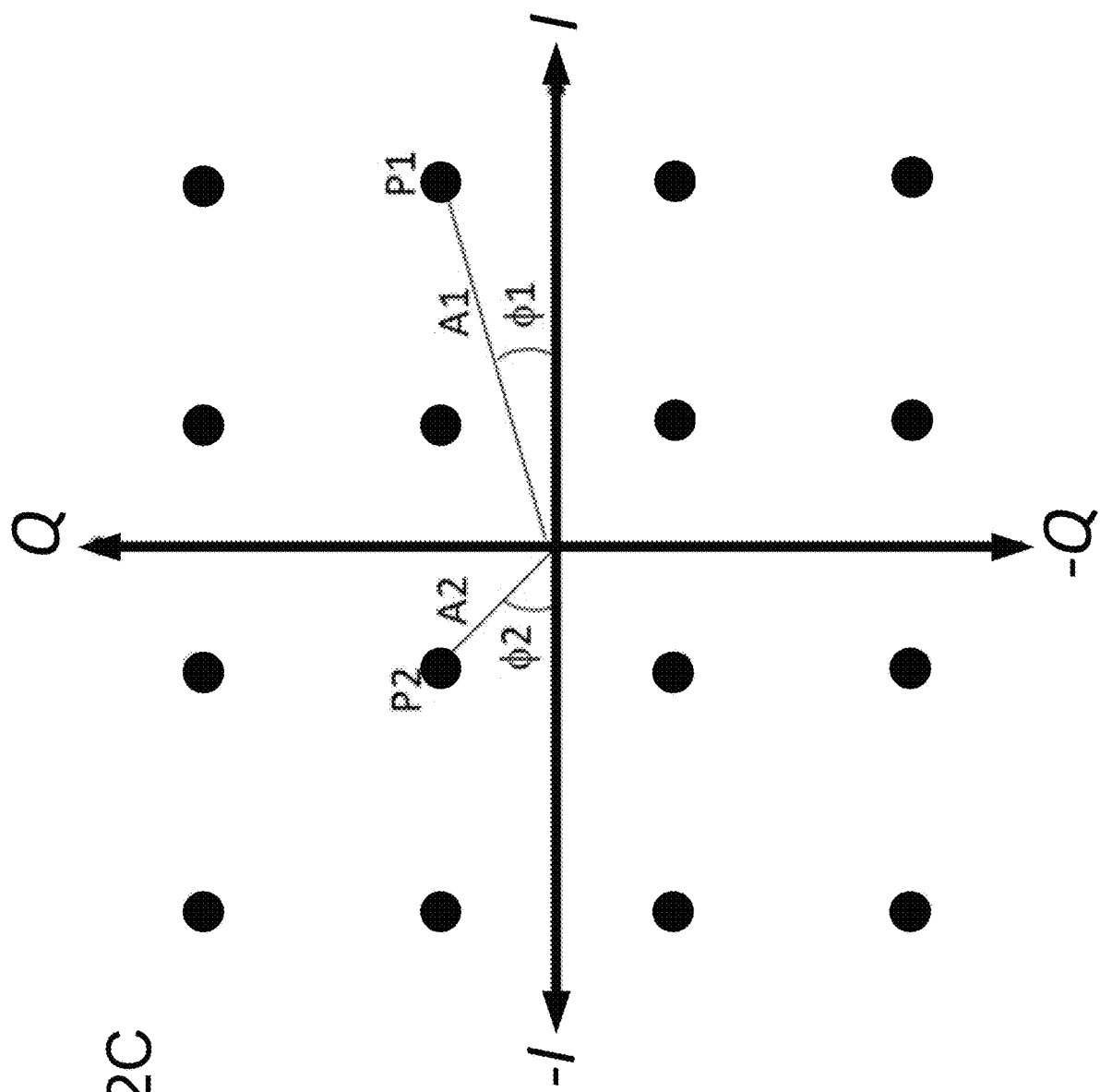

DATA SYNCHRONIZATION IN OPTICAL NETWORKS AND DEVICES

CROSS-REFERENCE TO RELATED APPLICATION

This application claims the benefit of U.S. Provisional Application No. 63/043,098, filed Jun. 23, 2020, which is incorporated herein by reference in its entirety.

FIELD

This specification generally relates to optical communication systems and synchronizing data transmissions between transmission and receiver systems.

BACKGROUND

Data transmitted across a communication network can be subject to interferences and distortions that can make it challenging for a receiving system to process and properly extract information from the communicated data. In addition, synchronization issues arising from incorrect estimation of frames at receiving systems can result in problems and delays in processing received data.

SUMMARY

To address signal quality and synchronization issues associated with data transmitted from a transmitter to a receiver over an optical communication network, the design of optical transmitters and receivers can be modified to implement methods in which such synchronization issues can be minimized or compensated for. In one aspect, the disclosure describes a circuit for joint estimation of the framer index and the frequency offset in an optical communication system. By estimating the framer index and frequency offset, the receiver can identify the beginning of a header portion of a data frame and process the received data in a manner synchronized to the way the data was transmitted by a transmitter.

In such aspects, the transmitter can generate a pseudo random sequence of symbols derived from the same constellation used for payload symbols in a frame. The generated sequence and a scrambled version of the symbols can be interleaved and used in the header of a frame to be transmitted by the transmitter. The frame structure can include header symbols, pilot symbols, and payload symbols.

A receiver that receives the transmitted frame can include a framer circuit. The framer circuit can use a sliding window to process the received samples. A width of the sliding window can be equal to the width of the header symbols inserted at the Tx side. Within the window, the received sequence of samples is de-interleaved. Two sequences of samples can be generated and the cross correlation between two sequences is calculated. The sliding window slides to the next symbol and performs the cross correlation for each position until all the symbols have been processed. Based on the absolute squared value of the cross correlation, a peak value for all the processed symbols can be identified. The peak value corresponds to a symbol position at which the frame header begins. In this manner, the beginning location of a framer header and a transmitted frame can be identified so that data transmitted received by the receiver can be synchronized to the data transmitted by the transmitter.

According to some aspects, the disclosure describes quantization implementations to improve the processing speed of a receiver.

According to some aspects, the disclosure describes implementations that utilize non-linear filtering to facilitate the estimation of the frame start index and the frequency offset.

According to some aspects, the disclosure describes implementations that can compensate for synchronization problems occurring as a result of a half symbol delay problem or oversampling.

According to some aspects, the disclosure describes implementations to perform for data synchronization, framer index estimation, and frequency offset estimation when multiple subcarriers are involved in transmitting data from a transmitter to a receiver.

According to some aspects, the disclosure describes implementations for estimating the effect of Chromatic Dispersion (CD) in a single carrier or multiple subcarriers.

According to some implementations, an apparatus including a mapper and processor circuitry is described. The mapper is operable to map data bits to a first set of symbols. The processor circuitry is operable to obtain the first set of symbols, generate a third set of symbols by mixing the first set of symbols with a second set of symbols, and interleave the first set of symbols with the third set of symbols. The processor circuitry is operable to generate a frame header including the interleaved first set of symbols and the interleaved third set of symbols, and generate a frame including the frame header and a payload. The frame header is appended to the payload that includes at least a portion of the first set of symbols. A transmitter circuit is coupled to the processor circuitry and is operable to output a modulated optical signal carrying information indicative of the frame.

In some implementations, the transmitter circuit includes a laser and a modulator. The laser is operable to provide a first optical signal. The modulator is operable to receive the first optical signal and output a modulated second optical signal to enable provisioning of the modulated optical signal.

In some implementations, the frame header is appended at a starting position of the frame and before the payload in the frame. The first set of symbols includes framer symbols, and the second set of symbols comprises a random sequence of symbols having a magnitude of 1 or −1.

In some implementations, to interleave the first set of symbols with the third set of symbols, the processor circuitry is operable to sequentially arrange symbols from the first set of symbols and symbols from the third set of symbols in an alternating manner.

In some implementations, to generate the frame header, the processor circuitry is operable to designate a first symbol of the interleaved first set of symbols as a pilot symbol, and designate each symbol occurring after a predetermined interval of symbols in the interleaved first set of symbols and the interleaved third set of symbols after the first symbol as a pilot symbol.

In some implementations, to generate the frame header, the processor circuitry is operable to insert a pair of pilot symbols at a beginning of the interleaved first set of symbols and the interleaved third set of symbols. The processor circuitry is also operable to insert additional pairs of pilot symbols after a predetermined interval of symbols after the pair of pilot symbols located at the beginning of the interleaved first set of symbols and the interleaved third set of symbols.

In some implementations, the processor circuitry is operable to insert a first pilot symbol at a beginning of the payload, and to insert pilot symbols after a predetermined interval of symbols after the first pilot symbol. The processor circuitry is operable to configure the frame to include the payload and the inserted pilot symbols.

According to some implementations, an apparatus including a receiver circuit and a processor is described. The receiver circuit is operable to receive a modulated optical signal carrying a frame of symbols. The frame of symbols includes a frame header having header symbols and a payload having payload symbols. The receiver circuit is operable to provide an electrical signal based on the modulated optical signal. The processor circuitry is operable to obtain the frame of symbols from the receiver circuit based on the electrical signal, and to deinterleave a portion of the frame of symbols to separate a first set of symbols from a second set of symbols included in the frame of symbols. The processor circuitry is operable to generate a third set of symbols by mixing the first set of symbols with a fourth set of symbols, determine a cross correlation of the third set of symbols and the second set of symbols, and identify a starting position of the frame header in the frame of symbols based on a peak value associated with the cross correlation of the third set of symbols and the second set of symbols. The starting position is used to synchronize data associated with the frame of symbols with information output by a transmitter.

In some implementations, the receiver circuit includes a local oscillator laser that is operable to supply a local oscillator signal. The optical hybrid circuit is operable to receive polarization components of the modulated optical signal and the local oscillator signal. The optical hybrid circuit is operable to supply mixing products. A photodiode circuit is operable to receive the mixing products and output a signal corresponding to the electrical signal.

In some implementations, the processor circuitry is operable to apply a slide window having a fixed length to the portion of the frame of symbols, determine the cross correlation of the third set of symbols and the second set of symbols when the slide window is applied to the portion of the frame of symbols, apply the slide window to a second portion of the frame of symbols, obtain a modified second set of symbols and a modified third set of symbols after applying the slide window to the second portion of the frame of symbols, and determine a second cross correlation of the modified third set of symbols and the modified second set of symbols. The second portion of the frame of symbols is shifted one symbol relative to the portion of the frame of symbols.

In some implementations, the processor circuitry is operable to determine a first absolute squared value of the cross correlation of the third set of symbols and the second set of symbols when the slide window is applied to the portion of the frame of symbols, determine a second absolute squared value of the second cross correlation when the slide window is applied to the second portion of the frame of symbols, and aggregate the first absolute squared value of the cross correlation and the second absolute squared value of the second cross correlation.

In some implementations, to identify a starting position of the frame header in the frame of symbols based on the peak value, the processor circuitry is operable to identify a highest value of aggregated absolute squared values of the cross correlation comprising the first absolute squared value of the cross correlation and the second absolute squared value of the second cross correlation.

In some implementations, to identify a starting position of the frame header in the frame of symbols based on the peak value, the processor circuitry is operable to identify a highest value of the cross correlation of the third set of symbols and the second set of symbols, and determine that the highest value satisfies a threshold level. In response to determining that the highest value satisfies a threshold level, the processor circuitry is operable to determine a position of a symbol corresponding to the highest value, and determine the position of the symbol corresponding to the highest value as a starting position of the frame header.

In some implementations, the fourth set of symbols comprises a random sequence of symbols having a magnitude of 1 or −1.

In some implementations, the apparatus includes a storage buffer to store the portion of the frame of symbols.

According to some implementations, an apparatus including a transmitter and a receiver is described. The transmitter includes first circuitry that is operable to generate a first set of symbols representative of data to be transmitted, generate a third set of symbols by mixing the first set of symbols with a second set of symbols, interleave the first set of symbols with the third set of symbols, generate a frame header based on the interleaved first set of symbols and the interleaved third set of symbols, and transmit a frame comprising the frame header. The receiver includes second circuitry operable to receive a second frame that includes a second frame header, deinterleave the second frame header to separate a fourth set of symbols from a fifth set of symbols, generate a seventh set of symbols by mixing the fourth set of symbols with a sixth set of symbols, determine a cross correlation of the fifth set of symbols and the seventh set of symbols, and determine a starting location of the second frame header by identifying a peak value associated with the cross correlation of the fifth set of symbols and the seventh set of symbols.

In some implementations, the first set of symbols comprises framer symbols, and each of the second set of symbols and the sixth set of symbols comprises a random sequence of symbols having a magnitude of 1 or −1.

In some implementations, the receiver is operable to apply a slide window having a fixed length to a portion of the second frame after receiving the second frame, determine the cross correlation of the fifth set of symbols and the seventh set of symbols when the slide window is applied to the portion of the second frame, apply the slide window to a second portion of the second frame, obtain a modified fifth set of symbols and a modified seventh set of symbols after applying the slide window to the second portion of the second frame, and determine a second cross correlation of the modified fifth set of symbols and the modified seventh set of symbols. The second portion of the second frame is shifted one symbol from the portion of the second frame.

In some implementations, the receiver is operable to determine a first absolute squared value of the cross correlation of the fifth set of symbols and the seventh set of symbols when the slide window is applied to the portion of the second frame, determine a second absolute squared value of the second cross correlation when the slide window is applied to the second portion of the second frame, and aggregate the first absolute squared value of the cross correlation and the second absolute squared value of the second cross correlation.

In some implementations, to determine the starting location of the second frame header by identifying the peak value associated with the cross correlation of the fifth set of symbols and the seventh set of symbols, the receiver is operable to identify a highest value of the cross correlation of the fifth set of symbols and the seventh set of symbols, determine that the highest value satisfies a threshold level, determine a position of a symbol corresponding to the highest value in response to determining that the highest value satisfies a threshold level, and determine the position of the symbol corresponding to the highest value as a starting position of the second frame header.

According to some implementations, an apparatus including a digital signal processor, digital to analog conversion circuitry, driver circuitry, a laser, and a modulator is described. The digital signal processor is operable to receive data, and supply a plurality of digital signals based on the data. The digital to analog conversion circuitry is operable to output analog signals based on the digital signals. The driver circuitry is operable to provide driver signals based on the analog signals. The laser is operable to provide an optical signal. The modulator is operable to receive the optical signal and output a modulated second optical signal to enable provisioning of the modulated optical signal based on the driver signals. The modulated optical signal includes a plurality of optical subcarriers. One of the optical subcarriers carries a plurality of symbols indicative of the digital signals that include a frame. The frame includes a header, which include first symbols, and a payload, which includes second symbols. The frame also includes third symbols that are pilot symbols different from the first symbols and the second symbols.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2C depicts an example of a 16-QAM constellation.

Like reference numbers and designations in the various drawings indicate like elements.

DETAILED DESCRIPTION

Figure 1A:
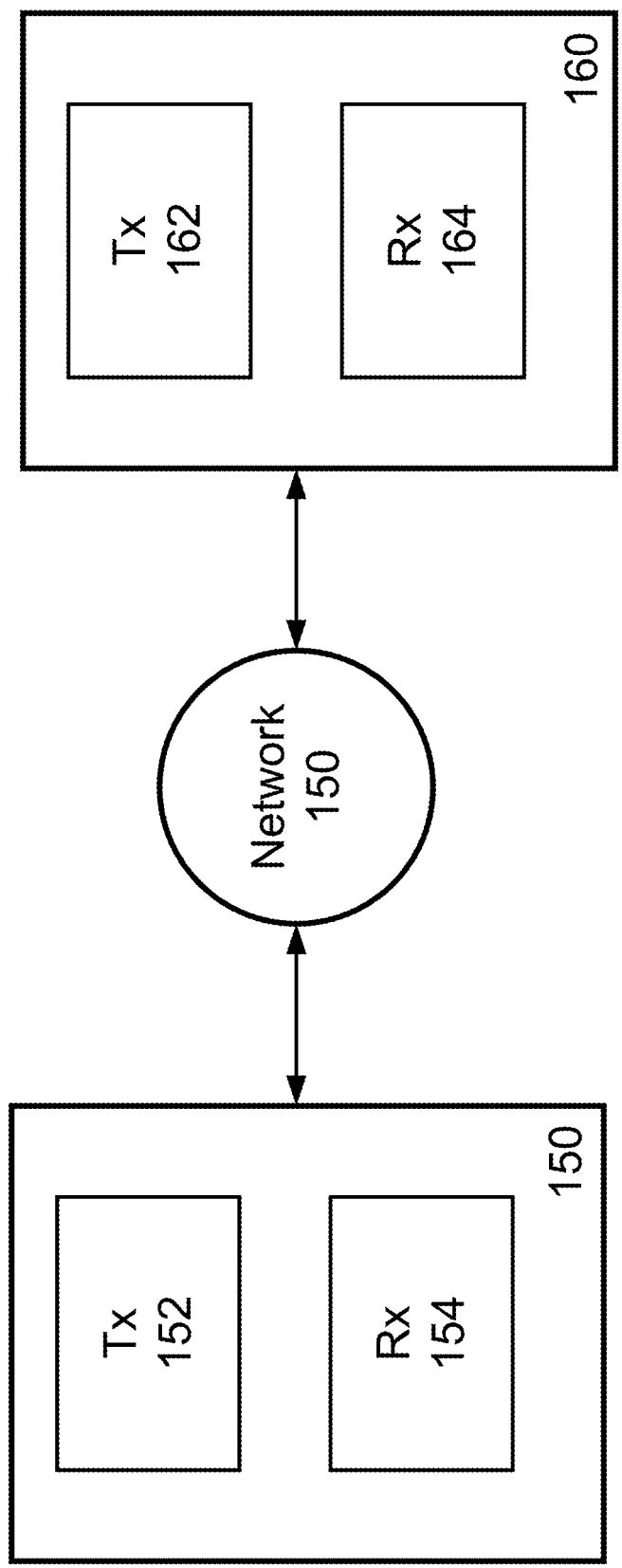
FIG. 1A depicts a block diagram of an example of two devices configured to communicate over a communication network.

FIG. 1A depicts an example of two devices 150, 160 configured to communicate with each other over a communication network 170.

Each of device 150 and 160 may be an electronic device configured to communicate over a wired or wireless network such as communication network 170. This electronic device may be a portable or non-portable device. In some implementations, devices 150 and 160 are optical devices and can include, but are not limited to, lasers, optical sub-assemblies, original equipment manufacturer (OEM) modules, optical transceivers, sensors, switches, filters, detectors, emitters, and amplifiers.

Device 150 can include a transmitter (Tx) 152 to transmit data to other devices, e.g., device 160, using the communication network 170. Device 150 can also include a receiver (Rx) 154 to receive data from other devices, e.g., device 160, via the communication network 170. Similarly, device 160 can include a transmitter (Tx) 162 to transmit data to other devices, e.g., device 150, through communication network 170, and a receiver (Rx) 164 to receive data from other devices, e.g., device 150, via communication network 170. For example, Tx 152 can transmit one or more modulated optical signals to Rx 164 through an optical communication path in the communication network 170. A description of an example of transmitters 152 and 162 is provided below with respect to FIGS. 1B and 2. A description of an example of receivers 154 and 164 is provided below with respect to FIGS. 1B and 2.

The communication network 170 can be a wired or wireless network to facilitate communication between multiple electronic devices or components. In some implementations, the communication network 170 can include an optical communication network with optical fiber cables that enable transmission of data in the form of light signals between multiple network nodes and devices, such as devices 150 and 160. The optical communication network can include various components and devices to facilitate the transmission of data across the network. These devices include, for example, amplifiers to amplify a modulated optical signal at various locations along an optical communication path in the optical communication network.

In some implementations, the network nodes may include primary nodes, also referred to as hub nodes, and secondary nodes, also referred to as leaf nodes. A primary node can communicate with multiple secondary nodes. For instance, a primary node may transmit optical subcarriers in a downstream direction to multiple secondary nodes. In some implementations, a primary node can have a data capacity to receive one or more gigabits of data per second for transmission to secondary nodes. Each secondary node may receive and output to a user or customer a portion of the data received from the primary node.

Figure 1B:
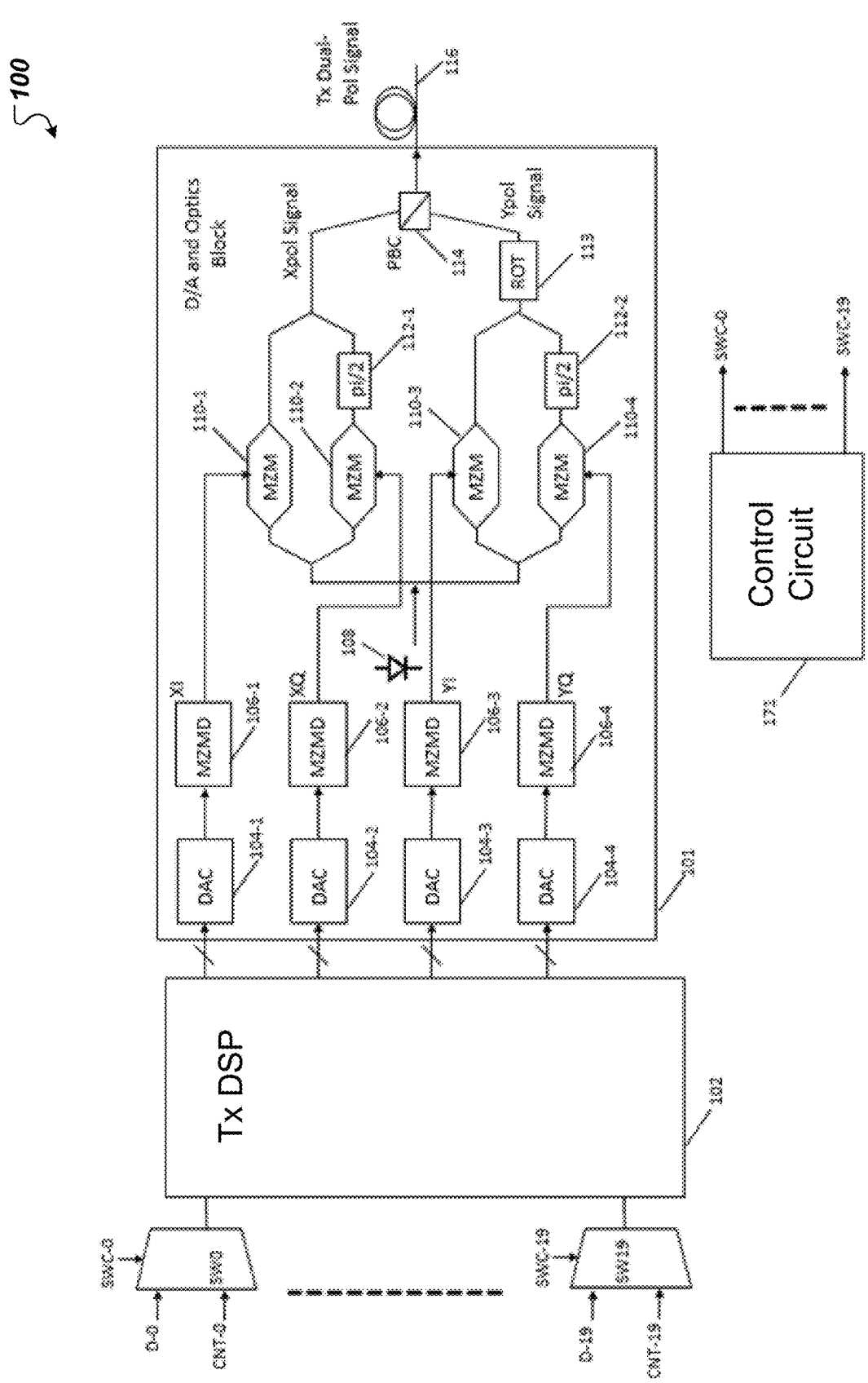
FIG. 1B depicts a block diagram of an example transmitter.

FIG. 1B depicts an example transmitter 100 that includes a plurality of switches SW and circuits that include a transmitter Digital Signal Processor DSP (Tx DSP) 102 and a D/A and optics block 101. In some cases, transmitter 100 can correspond to transmitter 152 or 162 shown in FIG. 1A. In the example shown in FIG. 1B, twenty switches (SW-0 to SW-19) are shown, although more or fewer switches can be used. Each switch SW can, in some instances, have two inputs: the first input can receive user data, and the second input can receive control information or signals (CNT). Each switch SW-0 to SW-19 can receive a respective one of control signals SWC-0 to SWC-19 output from control circuit 171, which can include a microprocessor, field programmable gate array (FPGA), or other processor circuit. Based on the received control signal, each switch SW-0 to SW19 can selectively output any one of the data streams D-0 to D-19, or a control signal CNT-0 to CNT-19. Control signals CNT can be any combination of configuration bits for control and/or monitoring purposes. For example, control signals CNT can include instructions to one or more of secondary nodes 112 to change the data output from such secondary nodes 112, such as by identifying the subcarriers associated with such data. In another example, the control signals can include a series of known bits used in secondary nodes 112 to "train" the receiver to detect and process such bits so that the receiver can further process subsequent bits. In a further example, the control channel CNT can include information that can be used by the polarization mode dispersion (PMD) equalizer circuits to correct for errors resulting from polarization rotations of the X and Y components of one or more subcarriers (SC). In another example, control information CNT can be used to restore or correct phase differences between laser transmit-side laser 108 and a local oscillator laser in each of the secondary nodes 112. In a further example, control information CNT can be used to recover, synchronize, or correct timing differences between clocks provided in the primary (110) and secondary nodes 112.

In another, example, one or more of switches SW can be omitted, and control signals CNT can be supplied directly to DSP 102. Moreover, each input to DSP 102, such as the inputs to FEC encoders 202 described below (see FIG. 2A), receives, in another example, a combination of control information described above as well as user data.

In a further example, control signal CNT includes information related to the number of subcarriers that can be output from each of secondary nodes 112. Circuit such as primary node DSP 102 can similarly be included in a secondary node Tx DSP to adjust or control the number of subcarriers output therefrom.

Based on the outputs of switches SW-0 to SW-19, DSP 102 can supply a plurality of outputs to D/A and optics block 101 including digital-to-analog conversion (DAC) circuits 104-1 to 104-4, which convert digital signal received from DSP 102 into corresponding analog signals. D/A and optics block 101 also includes driver circuits 106-1 to 106-2 that receive the analog signals from DACs 104-1 to 104-4 and adjust the voltages or other characteristics thereof to provide drive signals to a corresponding one of modulators 110-1 to 110-4.

D/A and optics block 101 further includes modulators 110-1 to 110-4, each of which can be, for example, a Mach-Zehnder modulator (MZM) that modulates the phase and/or amplitude of the light output from laser 108. The optical light signal output from laser 108, also included in block 101, is split such that a first portion of the light is supplied to a first MZM pairing, including MZMs 110-1 and 110-2, and a second portion of the light is supplied to a second MZM pairing, including MZMs 110-3 and 110-4. The first portion of the optical light signal is split further into third and fourth portions, such that the third portion is modulated by MZM 110-1 to provide an in-phase (I) component of an X (or TE) polarization component of a modulated optical signal, and the fourth portion is modulated by MZM 110-2 and fed to phase shifter 112-1 to shift the phase of such light by 90 degrees in order to provide a quadrature (Q) component of the X polarization component of the modulated optical signal. Similarly, the second portion of the optical light signal is further split into fifth and sixth portions, such that the fifth portion is modulated by MZM 110-3 to provide an I component of a Y (or TM) polarization component of the modulated optical signal, and the sixth portion is modulated by MZM 110-4 and fed to phase shifter 112-2 to shift the phase of such light by 90 degrees to provide a Q component of the Y polarization component of the modulated optical signal.

The optical outputs of MZMs 110-1 and 110-2 are combined to provide an X polarized optical signal including I and Q components and are fed to a polarization beam combiner (PBC) 114 provided in block 101. In addition, the outputs of MZMs 110-3 and 110-4 are combined to provide an optical signal that is fed to polarization rotator 113, further provided in block 101, that rotates the polarization of such optical signal to provide a modulated optical signal having a Y (or TM) polarization. The Y polarized modulated optical signal also is provided to PBC 114, which combines the X and Y polarized modulated optical signals to provide a polarization multiplexed ("dual-pol") modulated optical signal onto optical fiber 116, for example, which can be included as a segment of optical fiber in an optical communication path.

Subcarriers SC0-SC19 each have X and Y polarization components and I and Q components. Moreover, each subcarrier SC0 to SC19 can be associated with or corresponds to a respective one of the outputs of switches SW-0 to SW-19. In one example, switches SW2, SW7, SW12 can supply control information carried by a respective one of control signals CNT-2, CNT-7, CNT-12. Based on such control signals, DSP 102 provides outputs that result in optical subcarriers SC2, SC7, SC12 carrying data indicative of the control information carried by CNT-2, CNT-7, CNT-12, respectively. In addition, remaining subcarriers SC0, SC1, SC3 to SC6, SC8 to SC11, SC13 to SC19 carry information indicative of a respective one of data streams D-0, D-1, D-3 to D-6, D-8 to D-11, D-13 to D-19 output from a corresponding one of switches SW0, SW1, SW3 to SW-6, SW-8 to SW11, SW13 to SW19.

Figure 2A:
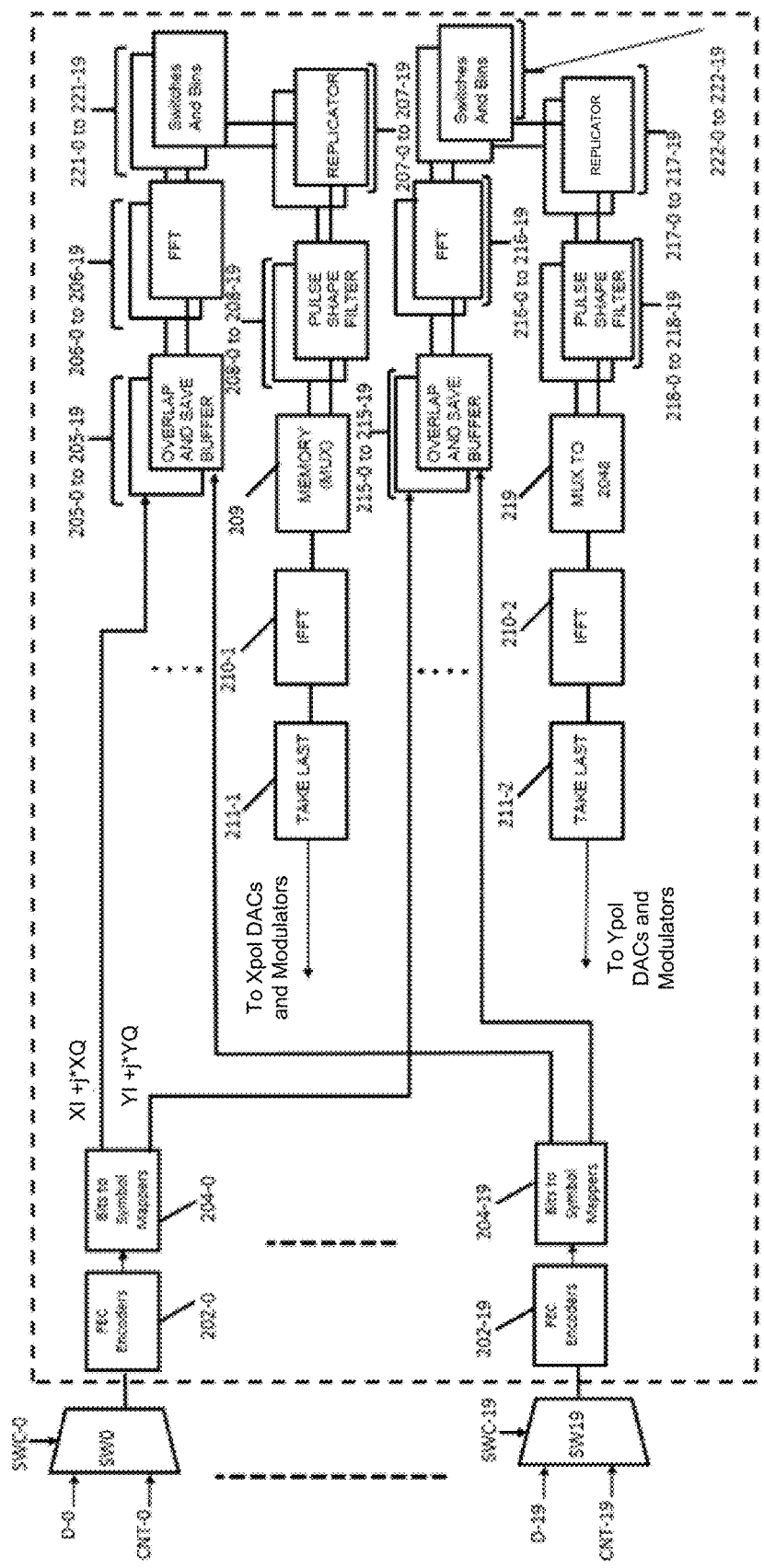
FIG. 2A depicts a block diagram of an example digital signal processor of the transmitter shown in FIG. 1B.

FIG. 2A shows an example of Tx DSP 102 in greater detail. Tx DSP 102 can include FEC encoders 202-0 to 202-19, each of which can receive a respective one of a plurality of the outputs from switches SW0 to SW19. FEC encoders 202-0 to 202-19 carry out forward error correction coding on a corresponding one of the switch outputs, such as, by adding parity bits to the received data. In addition, FEC encoders 202-0 to 202-19 can interleave data.

Figure 2B:
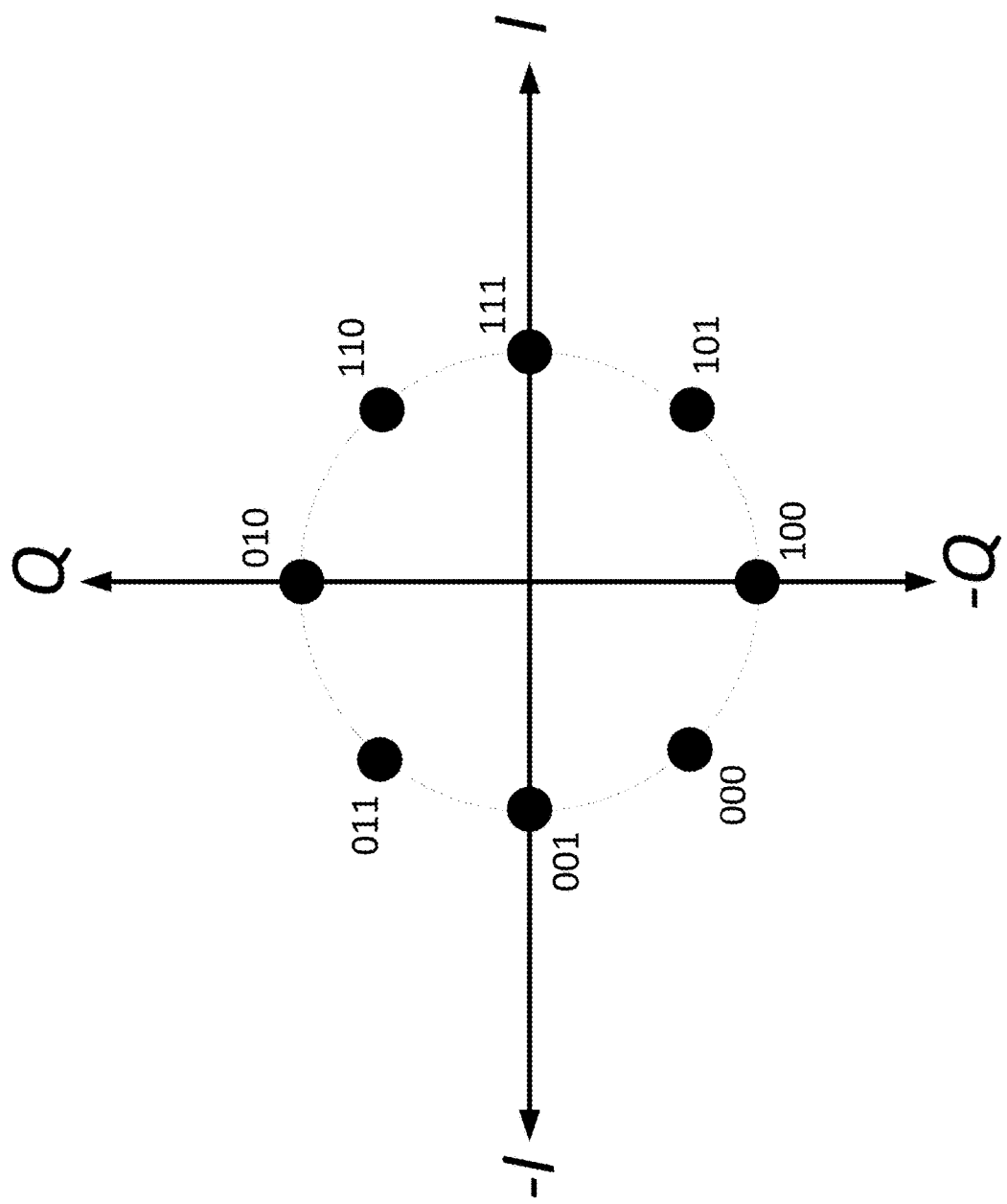
FIG. 2B depicts an example of a 8-PSK constellation.

Each of FEC encoders 202-0 to 202-19 provides an output to a corresponding one of a plurality of bits-to-symbol circuits, 204-0 to 204-19 (collectively referred to herein as "204"). Each of bits-to-symbol mapping circuits (mappers) 204 can map the m encoded bits to symbols (where m is a whole number greater than or equal to 2) on a complex plane. Examples of such mappings are shown in FIGS. 2B and 2C. In the example depicted in FIG. 2B, a 3 bit 8-PSK constellation is shown. The symbols are the located on approximately every 45° of a circular pattern having a radius that is equivalent to the magnitude of the real and imaginary parts of the symbols. This magnitude, which is equivalent to the distance from the origin to the symbol, can also provide power information of signal carrying these symbols.

FIG. 2C illustrates a constellation associated with a 16-QAM modulation format consistent with an additional aspect of the present disclosures. As generally understood, each point of the constellation corresponds to a particular symbol, and each symbol has an associated power or amplitude and phase on an IQ plane. For example, constellation point P1 represents a first symbol having an associated power or amplitude A1 corresponding to a distance from the origin of the IQ plane. Constellation point P2 represents a second symbol having an associated power or amplitude A2 corresponding to a different distance from the origin. Point P1 has an associated first phase, represented by angle $\Phi1$, and point P2 has an associated second phase, represented by angle $\Phi2$.

In some implementations, the bits-to-symbol mappers 204 can map four bits (m=4) to an X symbol+Y symbol in a dual-polarization QPSK constellation. Each of bits-to-symbol mappers 204 provide first symbols, having the complex representation XI+j*XQ, associated with a respective one of the switch outputs, such as D-0, to DSP 102. Data indicative of such first symbols is carried by the X polarization component of each subcarrier SC0-SC19.

Each of bits-to-symbol mappers 204 further can provide second symbols having the complex representation YI+j*YQ, also associated with a corresponding output of switches SW0-SW19. Data indicative of such second symbols, however, is carried by the Y polarization component of each of subcarriers SC-0 to SC-19.

Such mapping, as performed by mappers 204-0 to 204-19 define, in one example, a particular modulation format for each subcarrier. That is, such circuit can define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers can have a modulation format that is different than the modulation format of other optical subcarriers. That is, one of the optical subcarriers can have a QPSK modulation format and another optical subcarrier can have a different modulation format, such as 8-QAM or 16-QAM. In another example, one of the optical subcarriers has an 8-QAM modulation format and another optical subcarrier has a 16 QAM modulation format. Accordingly, although all the optical subcarriers can carry data at the same data and or baud rate, consistent with an aspect of the present disclosure one or more of the optical subcarriers can carry data at a different data or baud rate than one or more of the other optical subcarriers. Moreover, modulation formats, baud rates and data rates can be changed over time depending on, for example, capacity requirements. Adjusting such parameters can be achieved, for example, by applying appropriate signals to mappers 204 based on control information or data described herein and the communication of such data as further disclosed herein between primary and secondary nodes.

As further shown in FIG. 2A, each of the first symbols output from each of bits-to-symbol mappers 204 is supplied to a respective one of first overlap and save buffers 205-0 to 205-19 (collectively referred to herein as overlap and save buffers 205) that can buffer, for example, 256 symbols. Each of overlap and save buffers 205 can receive, for example, 128 of the first symbols or another number of such symbols at a time from a corresponding one of bits-to-symbol mappers 204. Thus, overlap and save buffers 205 can combine, for example, 128 new symbols from bits to symbol circuits 205, with the previous 128 symbols received from bits to symbol circuits 205.

Each overlap and save buffer 205 can supply an output, which is in the time domain, to a corresponding one of fast Fourier Transform (FFT) circuits 206-0 to 206-19 (collectively referred to as "FFTs 206"). In one example, the output includes 256 symbols or another number of symbols. Each of FFTs 206 can convert the received symbols to the frequency domain using or based on, for example, a fast Fourier transform. Each of FFTs 206 can provide the frequency domain data to bins and switches blocks 221-0 to 221-19. Bins and switches blocks 221 can include, for example, memories or registers, also referred to as frequency bins (FB) or points, that store frequency components associated with each subcarrier SC.

Each switch SW can selectively supply either frequency domain data output from one of FFT circuits 206-0 to 206-19 or a predetermined value, such as 0. In order to block or eliminate transmission of a particular subcarrier, the switches SW associated with the group of frequency bins FB associated with that subcarrier are configured to supply the zero value to corresponding frequency bins. Replicator components 207 as well as other components and circuits in DSP 102 can further process the zero (0) values to provide drive signals to modulators 110, such that subcarrier $SC_0$ is omitted from the optical output from the modulators.

On the other hand, some switches SW' (not shown) can be configured to supply the outputs of FFTs 206, i.e., frequency domain data FD, to corresponding frequency bins FB. Further processing of the contents of frequency bins FB by replicator components 207 and other circuits in DSP 102 can result in drive signals supplied to modulators 110, whereby, based on such drive signals, optical subcarriers are generated that correspond to the frequency bin groupings associated with that subcarrier.

Each of replicator components or circuits 207-0 to 207-19 can replicate the contents of the frequency bins FB and store such contents (e.g., for T/2 based filtering of the subcarrier) in a respective one of the plurality of replicator components. Such replication can increase the sample rate. In addition, replicator components or circuits 207-0 to 207-19 can arrange or align the contents of the frequency bins to fall within the bandwidths associated with pulse shaped filter circuits 208-0 to 208-19 described below.

Each of pulse shape filter circuits 208-0 to 208-19 can apply a pulse shaping filter to the data stored in the frequency bins of a respective one of the plurality of replicator components or circuits 207-0 to 207-19 to thereby provide a respective one of a plurality of filtered outputs, which are multiplexed and subject to an inverse FFT, as described below. Pulse shape filter circuits 208-1 to 208-19 calculate the transitions between the symbols and the desired subcarrier spectrum so that the subcarriers can be packed together spectrally for transmission, e.g., with a close frequency separation. Pulse shape filter circuits 208-0 to 208-19 also can be used to introduce timing skew between the subcarriers to correct for timing skew induced by links between nodes in the transmitter 100, for example. Multiplexer component 209, which can include a multiplexer circuit or memory, can receive the filtered outputs from pulse shape filter circuits 208-0 to 208-19, and multiplex or combine such outputs together to form an element vector.

Next, IFFT circuit or component 210-1 can receive the element vector and provide a corresponding time domain signal or data based on an inverse fast Fourier transform (IFFT). In one example, the time domain signal can have a rate of 64 GSample/s. Take last buffer or memory circuit 211-1, for example, can select the last 1024 samples, or another number of samples, from an output of IFFT component or circuit 210-1 and supply the samples to DACs 104-1 and 104-2 (see FIG. 1B) at 64 GSample/s, for example. As noted above, DAC 104-1 is associated with the in-phase (I) component of the X pol signal, and DAC 104-2 is associated with the quadrature (Q) component of the X pol signal. Accordingly, consistent with the complex representation XI+jXQ, DAC 104-1 receives values associated with XI and DAC 104-2 receives values associated with jXQ. As indicated by FIG. 1B, based on these inputs, DACs 104-1 and 104-2 can provide analog outputs to MZMD 106-1 and MZMD 106-2, respectively, as discussed above.

As further shown in FIG. 2A, each of bits-to-symbol mapping circuits (mappers) 204-0 to 204-19 can output a corresponding one of symbols indicative of data carried by the Y polarization component of the polarization multiplexed modulated optical signal output on fiber 116. As further noted above, these symbols can have the complex representation YI+j*YQ. Each such symbol can be processed by a respective one of overlap and save buffers 215-0 to 215-19, a respective one of FFT circuits 216-0 to 216-19, a respective one of replicator components or circuits 217-0 to 217-19, pulse shape filter circuits 218-0 to 218-19, multiplexer or memory 219, IFFT 210-2, and take last buffer or memory circuit 211-2, to provide processed symbols having the representation YI+j*YQ in a manner similar to or the same as that discussed above in generating processed symbols XI+j*XQ output from take last circuit 211-1. In addition, symbol components YI and YQ are provided to DACs 104-3 and 104-4 (FIG. 1B), respectively. Based on these inputs, DACs 104-3 and 104-4 can provide analog outputs to MZMD 106-3 and MZMD 106-4, respectively, as discussed above.

While FIG. 2A shows DSP 102 as including a particular number and arrangement of functional components, in some implementations, DSP 102 can include additional functional components, fewer functional components, different functional components, or differently arranged functional components. In addition, typically the number of overlap and save buffers, FFTs, replicator circuits, and pulse shape filters associated with the X component can be equal to the number of switch outputs, and the number of such circuits associated with the Y component can also be equal to the number of switch outputs. However, in other examples, the number of switch outputs can be different from the number of these circuits.

As noted above, based on the outputs of MZMDs 106-1 to 106-4, a plurality of optical subcarriers $SC_0$ to $SC_{19}$ can be output onto optical fiber 116 (FIG. 1B), which is coupled to a primary node 110.

Consistent with an aspect of the present disclosure, the number of subcarriers transmitted from primary node 110 to secondary nodes 112 can vary over time based, for example, on capacity requirements at the primary node and the secondary nodes. For example, if less downstream capacity is required initially at one or more of the secondary nodes, transmitter 100 in primary node 110 can be configured to output fewer optical subcarriers. On the other hand, if further capacity is required later, transmitter 100 can provide more optical subcarriers.

In addition, if, for example, based on changing capacity requirements, a particular secondary node 112 should be adjusted, the output capacity of such secondary node can be increased or decreased by, in a corresponding manner, increasing or decreasing the number of optical subcarriers output from the secondary node.

By storing and subsequently processing zeros (0s) or other predetermined values in frequency bin FB groupings associated with a given subcarrier SC, the subcarrier can be removed or eliminated. To add or reinstate such subcarrier, frequency domain data output from the FFTs 206 can be stored in frequency bins FB and subsequently processed to provide the corresponding subcarrier. Thus, subcarriers can be selectively added or removed from the optical outputs of primary node transmitter 100, such that the number of subcarriers output from such transmitters can be varied, as desired.

In the above example, zeros (0s) or other predetermined values are stored in selected frequency bins FBs to prevent transmission of a particular subcarrier SC. Such zeroes or values can, instead, be provided, for example, in a manner similar to that described above, at the outputs of corresponding replicator components 207 or stored in corresponding locations in memory or multiplexer 209. Alternatively, the zeroes or values noted above can be provided, for example, in a manner similar to that described above, at corresponding outputs of pulse shape filters 208.

In a further example, a corresponding one of pulse shape filters 208-1 to 208-19 can selectively generate zeroes or predetermined values that, when further processed, also cause one or more subcarriers SC to be omitted from the output of either primary node or secondary node. For instance, pulse shape filters 208-0 to 208-19 can include groups of multiplier circuits M0-0 to M0-$n$ . . . M19-0 to M19-$n$ (not shown, also individually or collectively referred to as M). Each multiplier circuit M constitutes part of a corresponding butterfly filter. In addition, each multiplier circuit grouping is associated with a corresponding one of subcarriers SC.

Each multiplier circuit M receives a corresponding one output from replicator components 207. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then can be subject to further processing similar to that described above to provide drive signals to modulators 110 that result in a corresponding subcarrier SC being omitted from the output of the transmitter 100.

On the other hand, in order to provide a subcarrier SC, each of the multiplier circuits M within a particular grouping can multiply a corresponding one of replicator outputs RD by a respective one of coefficients C0-0 to C0-$n$ . . . C19-0 to C19-$n$, which results in at least some non-zero products being output. Based on the products output from the corresponding multiplier grouping, drive signals are provided to modulators 110 to output the desired subcarrier SC from the transmitter 100.

Accordingly, for example, in order to block or eliminate subcarrier SC0, each of multiplier circuits M0-0 to M0-$n$ (associated with subcarrier $SC_0$) multiplies a respective one of replicator outputs RD0-0 to RD0-$n$ by zero (0). Each such multiplier circuit, therefore, provides a product equal to zero, which is further processed, such that resulting drive signals cause modulators 110 to provide an optical output without SC0. In order to reinstate $SC_0$, multiplier circuits M0-0 to M0-$n$ multiply a corresponding one of appropriate coefficients C0-0 to C0-$n$ by a respective one of replicator outputs RD0-0 to RD0-$n$ to provide products, at least some of which are non-zero. Based on these products, as noted above, modulator drive signals are generated that result in subcarrier $SC_0$ being output.

The above examples are described in connection with generating or removing the X component of a subcarrier SC. The processes and circuitry described above can be employed or included in Tx DSP 102 and optical circuitry used to generate the Y component of the subcarrier to be blocked. For example, switches and bins circuit blocks 222-0 to 222-19, have a similar structure and operate in a similar manner as switches and bins circuit blocks 221 described above to provide zeroes or frequency domain data as the case can be to selectively block the Y component of one or more subcarriers SC.

When signals are transmitted over an optical fiber 116 or, in general, across a channel 310 to another device using, for example, the transmitter 100, the quality of the transmitted signal can be compromised and/or the receiver (Rx) may not be synchronized to the transmission of data from the transmitter 100. To address such problems, certain circuits can be implemented to provide different levels of synchronization. Furthermore, in some cases, different layers of synchronization can be implemented to facilitate communication between a transmitter Tx and a receiver Rx. Such layers are generally implemented as a set of agreements between a transmitter Tx and a receiver Rx. Examples of these agreements are baud rate, data rate and modulation format.

This disclosure provides details of an example agreement directed to the frame structure of signals communicated between a transmitter Tx such as transmitter 100 and a receiver Rx such as receiver 502 described with reference to the figures. A frame structure determines the format of one full cycle of data transmission between a transmitter Tx and a receiver Rx. This format can include the position of header symbols (if any), the position of pilot symbols (if any), and the position of payloads. The frame structure can also be used to determine the position of symbols relative to others and can inform a receiver Rx where to look for various types of symbols within a sequence of received symbols.

Figure 8:
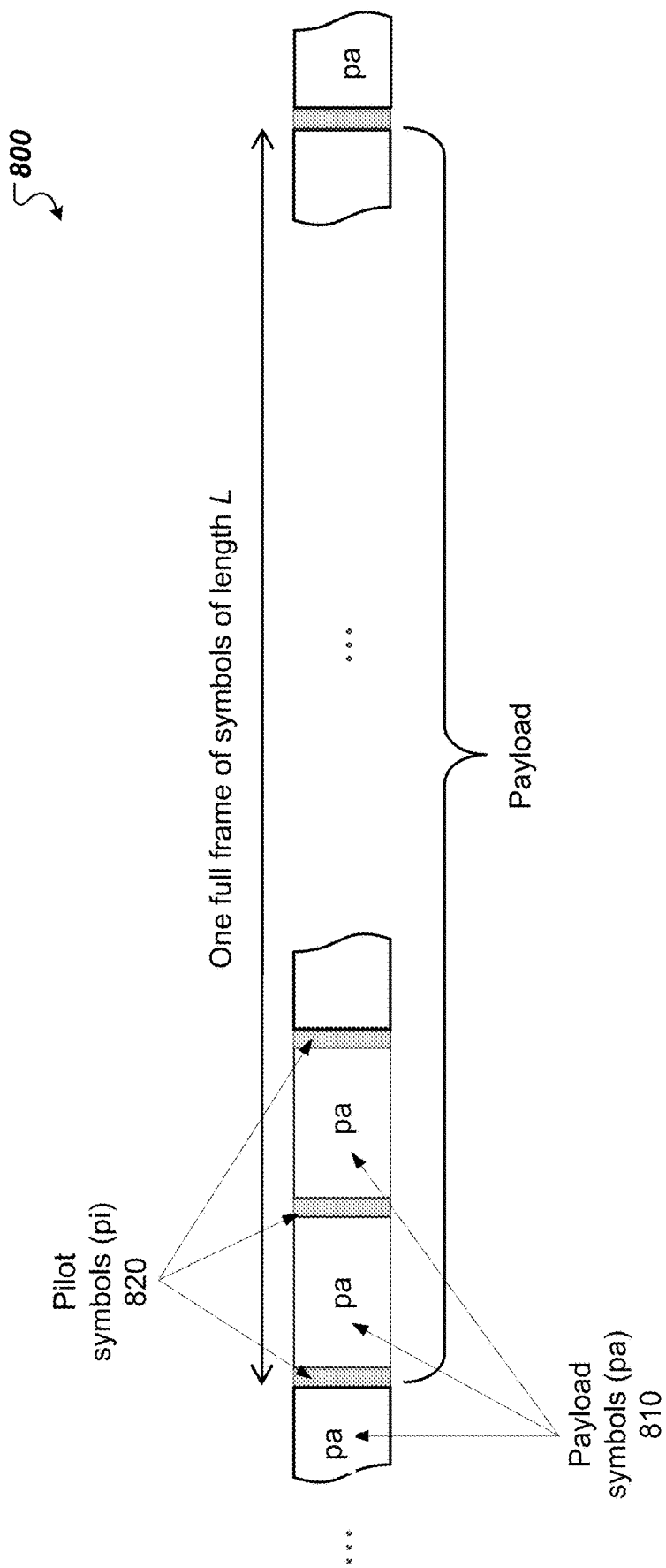
FIG. 8 depicts an example of a payload frame structure.

FIG. 8 depicts an example of a payload frame structure 800 having length L. The payload frame structure 800 includes an alternating sequence of payload symbols (pa) 810 and pilot symbols (pi) 820. The payload frame structure 800 can be generated by inserting a pilot symbol (pi) 820 at the beginning of the payload data and additional pilot symbols (pi) 820 after a predetermined interval of payload symbols (pa) 810 following the first pilot symbol. This can be dones for all payload data to be transmitted in a frame. In this manner, the pilot symbols 820 are uniformly distributed between the payload symbols 810. However, one issue with using this structure is that it is difficult for a receiver Rx to detect the beginning of the frame or estimate a frequency offset. Without determining the beginning of the frame, a receiver Rx may not be able to properly synchronize the data it received with the data transmitted by transmitter 100.

Figure 9:
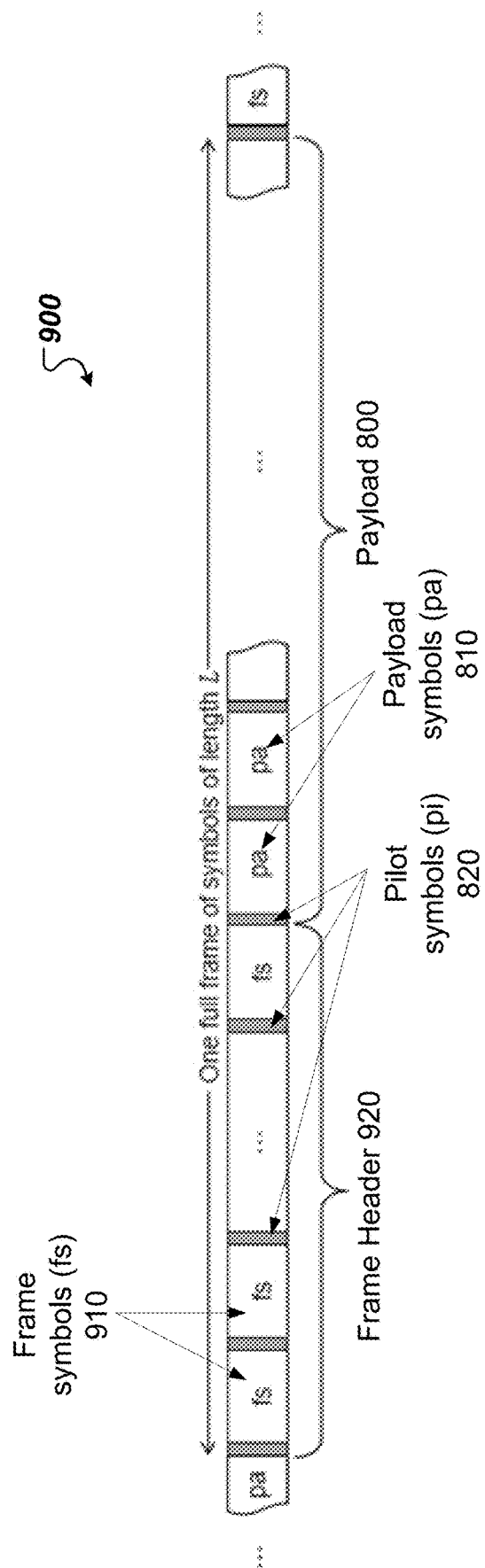
FIG. 9 depicts an example of a frame structure that includes a frame header and a payload.

FIG. 9 depicts an example of a frame structure 900 that includes a frame header 920 and a payload 800. Frame structure 900 includes a payload 800 that is the same as the payload 800 shown in FIG. 8 and additionally includes a frame header of H symbols preceding the payload 800. The frame header 920 can be used to indicate the beginning of a frame.

The frame structure 900 includes three types of symbols, namely a frame symbol (fs) 910, a payload symbol (pa) 810, and a pilot symbol (pi) 820. A frame symbol 910 is inserted at the beginning of each frame. The frame symbol 910 can be used for frequency offset estimation, BER calculation, and framing. A payload symbol 810 can carry information to be communicated to the receiver Rx and is located after the frame header. Pilot symbols 820 can be uniformly distributed between other symbols. For example, as shown in FIG. 9, pilot symbols 820 are uniformly distributed across the frame header 920 and the payload 800 and can separate frame symbols 910 and payload symbols 810.

The payload portion of a frame can be thousands of symbols long, e.g., 200,000 symbols, and pilot symbols can be inserted after regular intervals, e.g., every 32 or 64 payload symbols. The frame header can be hundreds of symbols in length and the pilot symbols can be inserted every 32 or 64 frame symbols. The order of pilot symbols can be stored in a look up table (LUT) and can be shared with a receiver Rx as part of a frame structure agreement. Pilot symbols 820 can be used for training-based equalization, and cycle slip detection/correction. However, to perform operations such as training-based equalization, the location of the pilot symbols 820 should be known first.

Figure 3:
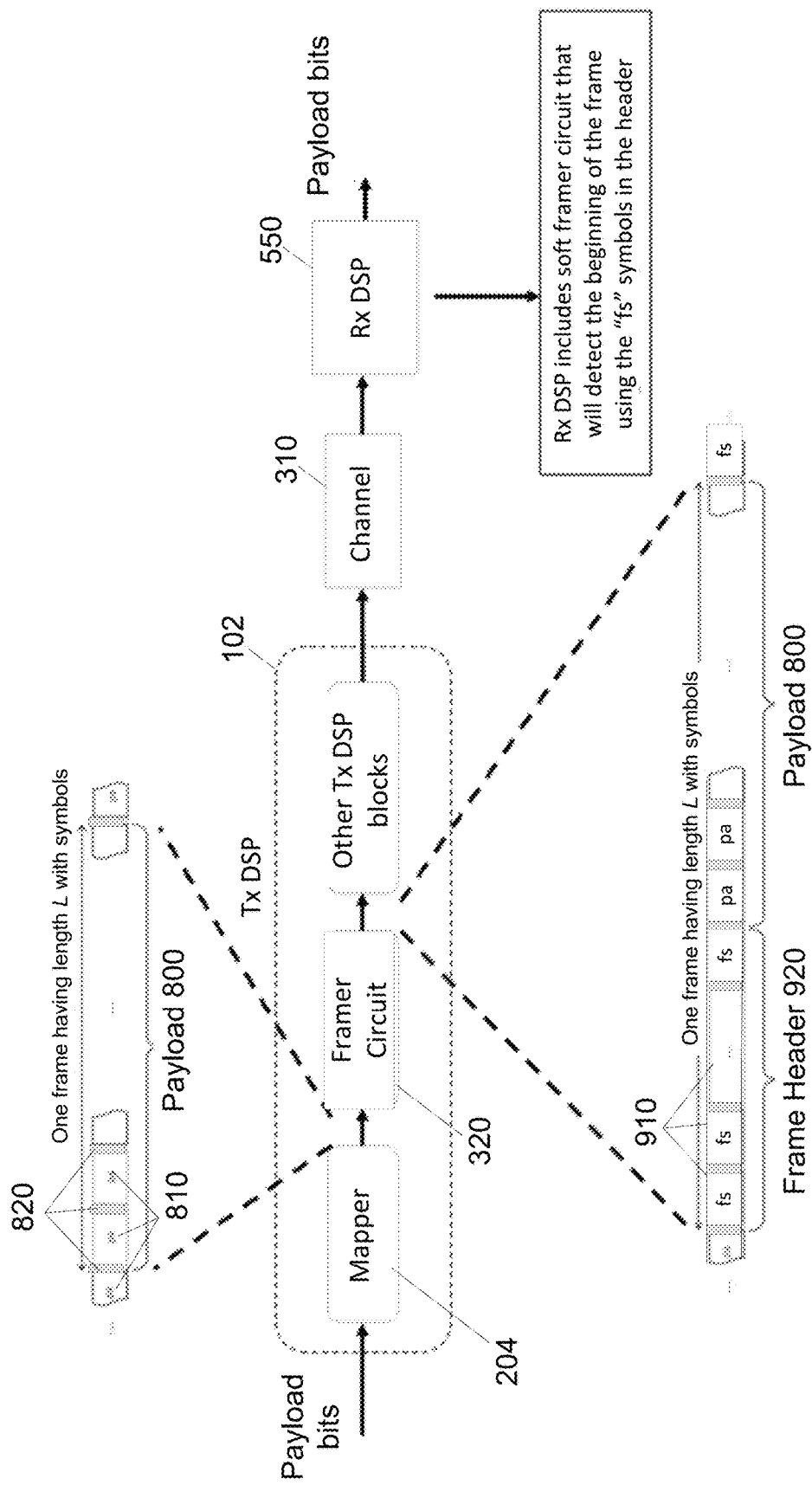
FIG. 3 depicts an example optical communication system with a transmitter transmitting a frame with frame header, pilot, and payload symbols across a channel to a receiver.
Figure 4:
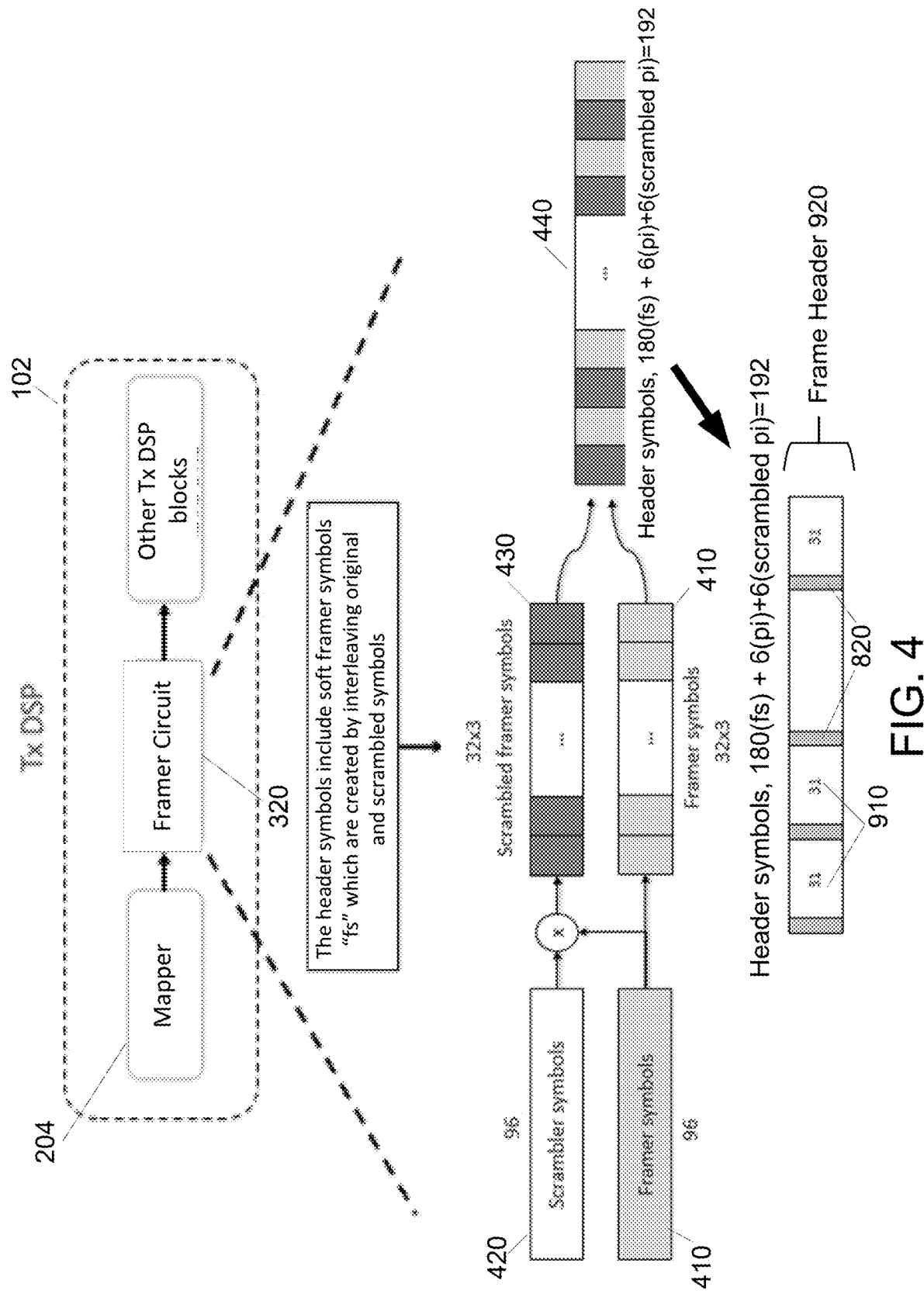
FIG. 4 depicts an example of a transmitter digital signal processor interleaving framer and pilot symbols in a frame header.

A receiver Rx would know where to look for the particular symbols in a sequence of receiver symbols by virtue of having a frame structure agreement in place between a transmitter Tx and the receiver Rx. As an example, in FIG. 9, by detecting the presence and location of frame symbols 910, a receiver Rx can be able to identify the beginning of transmitted frame. Furthermore, through the use of a LUT, the receiver Rx can use the sequence of pilot symbols to determine the correct sequence of transmitted data. FIGS. 3 and 4 describe how a transmitter Tx can be configured to generate a frame structure with header and frame symbols 910. FIGS. 5, 5A, 6, and 7 describe how a receiver Rx can be configured to detect the beginning of a transmitted frame (framer index).

The operations shown in FIGS. 3 and 4 can be executed by the Tx DSP 102 described in FIGS. 1 and 2. In some implementations, a Tx framer circuit 320 can be included in the Tx DSP 102 to execute these operations. The Tx framer circuit 320 can be included in different locations of the Tx DSP 102 before the symbols are processed by the overlap and safe buffer 205. For example, in some implementations, the Tx framer circuit 320 can be implemented between the mappers 204 an the overlap and save buffers 205. In some implementations, the Tx framer circuit 320 can be implemented between the FEC encoders 202 and the mappers 204.

In general, the Tx framer circuit 320 can include hardware and/or software that can execute commands to implement the operations described in this specification. Instructions for executing one or more of these operations can be stored in a storage device integrated with, coupled to, or accessible by the Tx DSP 102. After the Tx DSP 102 obtains these instructions, the Tx framer circuit 320 can execute the operations according to the commands in the stored instructions in the manner described below with respect to FIGS. 3 and 4.

After mappers 204 (e.g., mappers 204-0 to 204-19 shown in FIGS. 2A and 3) generate symbols from bits, a sequence of payload symbols (pa) 810 with intervening pilot symbols (pi) 820 can be generated. In some implementations, before FFT operations are performed, e.g., by FFT 206-0 to 206-19 and 216-0 to 216-19 shown in FIG. 2A, the Tx framer circuit 320 can add a header with frame symbols (fs) 910 to the frame structure as described with reference to FIG. 4.

FIG. 4 depicts an example of interleaving framer symbols 910 and pilot 820 symbols in a frame header 920. The frame header 920 can be of various sizes, e.g., various multiples of 32 symbols. In the example shown in FIG. 4, a frame header 920 having 192 symbols is to be generated. In such instances, half (96) the number of symbols can be selected to be used as framer symbols 410. In some implementations, the selection is made randomly. In some implementations, the selection of framer symbols 410 must satisfy a power constraint such that the average power of framer symbols 410 is equal to the average power of the payload symbols (pa) 810. In such implementations, the Tx DSP 102 can additionally perform an operation to check the average power of the symbols (pa) 810 and the framer symbols 410 when selecting the framer symbols 410. As noted above, the average power can be determined using the amplitude and phase associated with the symbols.

Next, an equal number (96) of scrambler symbols 420 as framer symbols 410 can be obtained and multiplied with each framer symbol to yield scrambled framer symbols 430. The scrambler symbols 420 have random values of 1 or −1. As shown in FIG. 4, a first processing path can include the scrambled framer symbols 430. The initial framer symbols 410 can occupy a second processing path. An interleaving operation can then be performed such that the scrambled framer symbols 430 from the first processing path are interleaved with framer symbols 410 from the second processing path to generate a header portion 440.

The interleaving can be implemented in various ways. In some cases, the framer symbols 410 and the scrambled framer symbols 430 can be concatenated one after another. In some cases, the framer symbols 410 and the scrambled framer symbols 430 can be designated to be located an even and odd index positions in the sequence of pilots. In some cases, a fixed number of framer symbols 410 are placed first followed by the same number symbols of the scrambled framer symbols 430. This continues until all symbols from the two processing paths are consumed.

In some implementations, after generating the interleaved sequence of symbols resulting in header portion 440, every $32^{nd}$ symbol can be designated as the pilot symbol. In some implementations, a pilot symbol can be inserted into every $32^{nd}$ symbol slot of the interleaved structure. A scrambled version of the pilot symbols can also be inserted after every $32^{nd}$ symbol (not at the same position as the pilot symbol) of the interleaved structure to be able to get a peak cross correlation. The position of the scrambled pilot symbols with respect to the pilot symbols can depend on the interleaving period. Two header symbols in every set of 32 pilots can be removed from the interleaved sequence to accommodate the insertion of the pilot and scrambled pilot symbols while keeping the total symbol count to 192 header symbols. In this manner, a frame header 920 structure with framer symbols (fs) 910 separated by pilot symbols (pi) 820 can be generated. Information for each pilot symbol can be stored in a look up table and shared with a receiver Rx. For example, in the illustrated frame header 920 structure, 6 pilot symbols are present at positions 1, 33, 65, 97, 129, and 161. And 6 scrambled pilot symbols are present at positions 4, 36, 68, 100, 132, and 164 if we interleave every 3 symbols (interleaving period). The position of the scrambled pilot symbols can vary if the interleaving period is changed. The remaining 180 symbols in the frame header 920 are framer symbols.

As shown in FIG. 3, after the addition of the frame header 920 to the payload 800, the frame can be processed by other components of the Tx DSP 102 and transmitter 100 (see FIGS. 1 and 2) before being transmitted over a channel 310 towards a receiver Rx, which includes a Rx DSP 550 to process the received signal. As discussed in more detail below in FIGS. 5, 5A, 6, and 7, the Rx DSP includes a Rx framer circuit 710 that can detect the beginning of the frame using the framer symbols (fs) 910 in the frame header 920.

Figure 5:
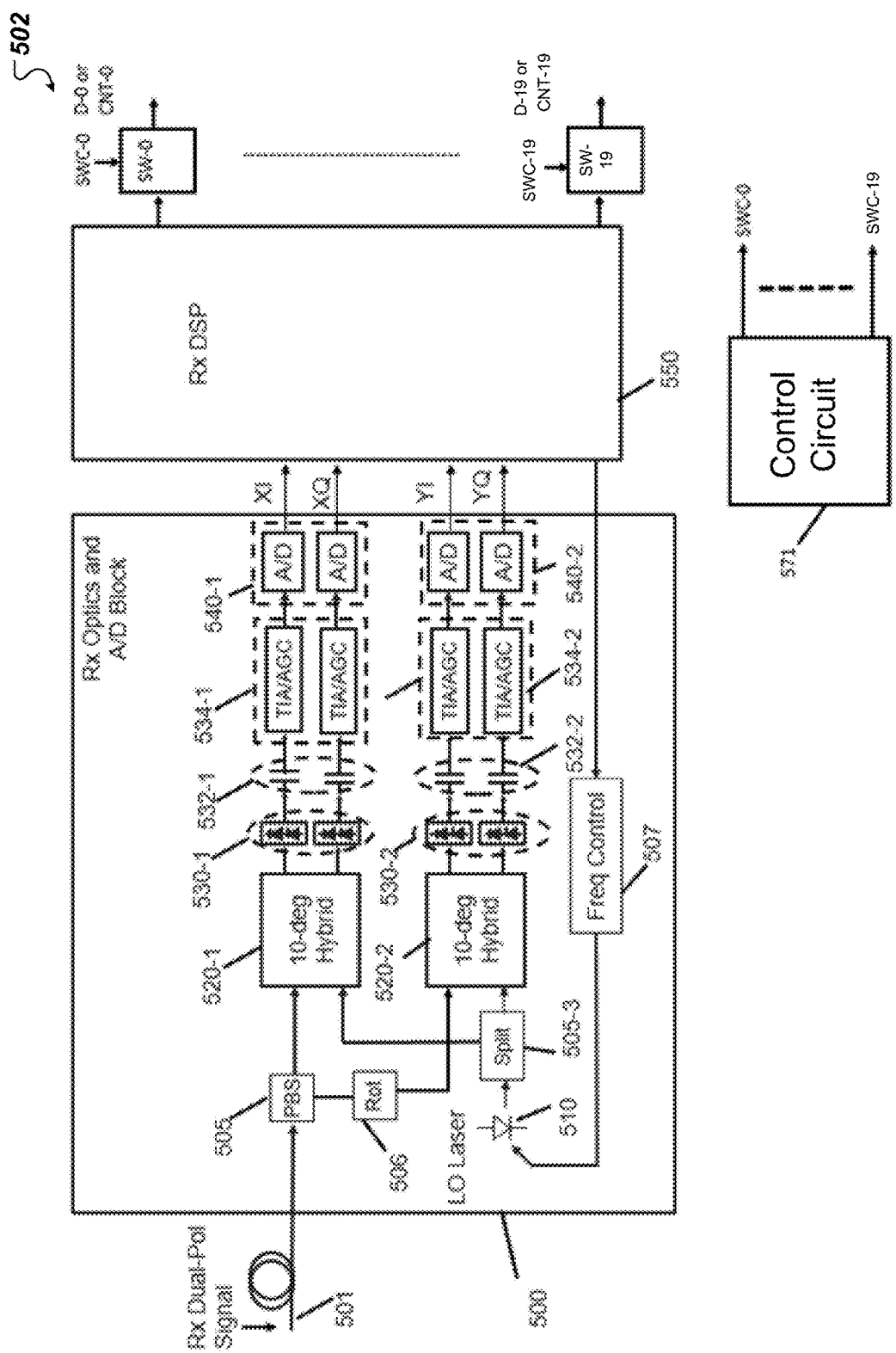
FIG. 5 a block diagram of an example receiver.

FIG. 5 depicts an example of a receiver Rx such as receiver 502 that includes an Rx optics and A/D block 500 and Rx DSP 550 to carry out coherent detection. In some cases, receiver 502 can correspond to receiver Rx 154 or 164 shown in FIG. 1A. The Rx optics and A/D block 500 can include a polarization splitter (PBS) 505 with first and second outputs, a splitter 505-3, a local oscillator (LO) laser 510, 10 degree optical hybrid circuits or mixers 520-1 and 520-2 (referred to generally as hybrid mixers 520 and individually as hybrid mixer 520), detectors 530-1 and 530-2 (referred to generally as detectors 530 and individually as detector 530, each including either a single photodiode or balanced photodiode), AC coupling capacitors 532-1 and 532-2, transimpedance amplifiers/automatic gain control circuits TIA/AGC 534-1 and 534-2, ADCs 540-1 and 540-2 (referred to generally as ADCs 540 and individually as ADC 540).

Polarization beam splitter (PBS) 505 can include a polarization splitter that receives an input polarization multiplexed optical signal including optical subcarriers $SC_0$ to $SC_{19}$ supplied by optical fiber link 501, which can be, for example, an optical fiber segment as part of one of optical communication path 116. PBS 505 can split the incoming optical signal into the two X and Y orthogonal polarization components. The Y component can be supplied to a polarization rotator 506 that rotates the polarization of the Y component to have the X polarization. Hybrid mixers 520 can receive and combine the X and rotated Y polarization components with light from local oscillator laser 510, which, in one example, is a tunable laser. For example, hybrid mixer 520-1 can combine a first polarization signal (e.g., the component of the incoming optical signal having a first or X (TE) polarization output from a first PBS port with light from local oscillator 510, and hybrid mixer 520-2 can combine the rotated polarization signal (e.g., the component of the incoming optical signal having a second or Y (TM) polarization output from a second PBS port) with the light from local oscillator 510. In one example, polarization rotator 510 can be provided at the PBS output to rotate Y component polarization to have the X polarization.

Figure 5A:
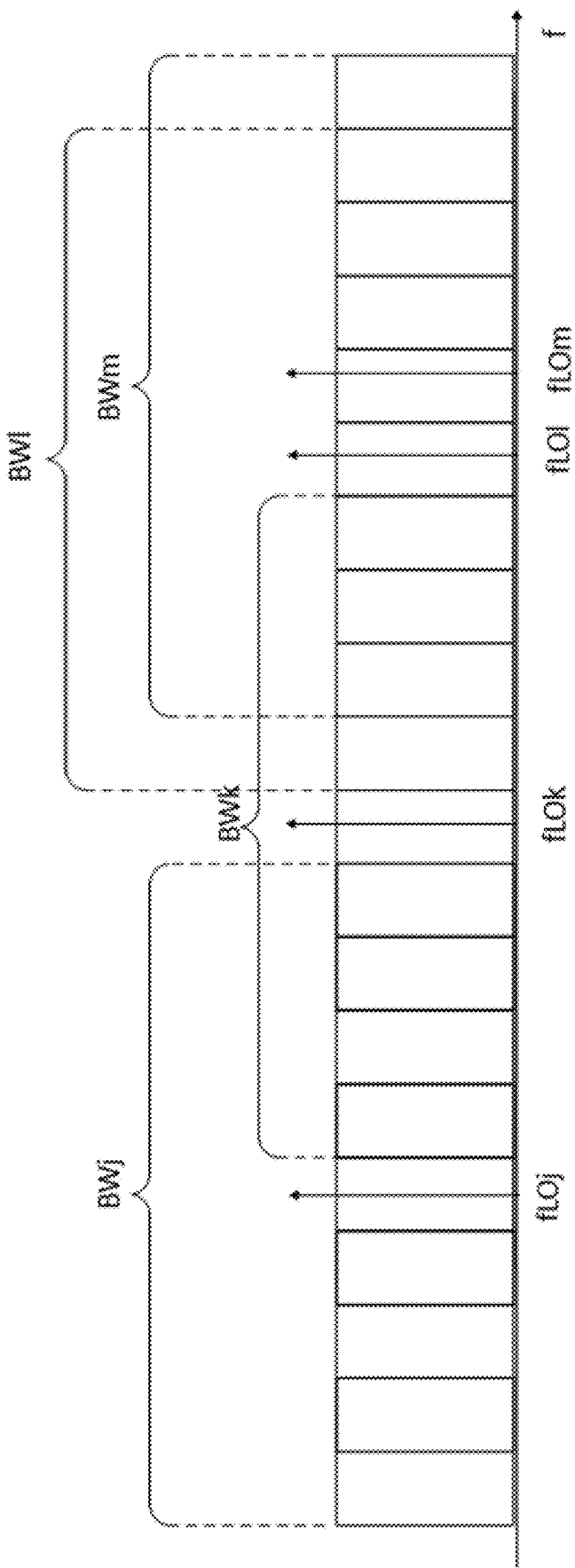
FIG. 5A depicts a spectrum of bandwidths associated with different nodes.

Detectors 530 can detect mixing products output from the optical hybrids, to form corresponding voltage signals, which are subject to AC coupling by capacitors 532-1 and 532-1, as well as amplification and gain control by TIA/AGCs 534-1 and 534-2. The outputs of TIA/AGCs 534-1 and 534-2 and ADCs 540 can convert the voltage signals to digital samples. For example, two detectors (e.g., photodiodes) 530-1 can detect the X polarization signals to form the corresponding voltage signals, and a corresponding two ADCs 540-1 can convert the voltage signals to digital samples for the first polarization signals after amplification, gain control and AC coupling. Similarly, two detectors 530-2 can detect the rotated Y polarization signals to form the corresponding voltage signals, and a corresponding two ADCs 540-2 can convert the voltage signals to digital samples for the second polarization signals after amplification, gain control and AC coupling. Rx DSP 550 can process the digital samples associated with the X and Y polarization components to output data associated with one or more subcarriers within a group of subcarriers. For example, as shown in FIG. 5A, $SC_0$ to $SC_{19}$ can be encompassed by the bandwidth (one of bandwidths BWj, BWk, BWl, and BWm) associated with a secondary node housing the DSP 550. In particular, subcarriers $SC_0$ to $SC_8$ are within bandwidth BWj, and such subcarriers can be processed by the receiver in a secondary node 112. Subcarriers $SC_5$ to $SC_{13}$ can be located within bandwidth BWk and processed by the receiver in secondary node 112. That is, bandwidths BWj and BWk overlap, such that subcarriers within the overlapped portions of these bandwidths, namely, subcarriers $SC_5$ to $SC_8$, will be processed by the receivers in one or more secondary nodes 112. Similarly, subcarriers $SC_{10}$ to $SC_{18}$ are within bandwidth BWl and subcarriers SC11 to SC19 are within bandwidth BWm, which substantially overlaps with BWm, as shown in FIG. 5A.

While FIG. 5 shows receiver 502 as including a particular number and arrangement of components, in some implementations, receiver 502 can include additional components, fewer components, different components, or differently arranged components. The number of detectors 530 and/or ADCs 540 can be selected to implement an receiver 502 that is capable of receiving a polarization multiplexed signal. In some instances, one of the components illustrated in FIG. 5 can carry out a function described herein as being carry out by another one of the components illustrated in FIG. 5.

Consistent with the present disclosure, in order to select a particular subcarrier or group of subcarriers at a secondary node 112, local oscillator 510 can be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by Rx DSP 550.

As noted above, each secondary node 112 can have a smaller bandwidth than the bandwidth associated with primary node 110. The subcarriers encompassed by each secondary node 112 can be determined by the frequency of the local oscillator laser 510 in the receiver 502. For example, as shown in FIG. 5A, bandwidth BWj associated with a secondary node 112-*j* can be centered about local oscillator frequency fLOj, bandwidth BWk associated with secondary node 112-*k* can be centered about local oscillator frequency fLOk, bandwidth BWl associated with secondary node 112-*l* can be centered about local oscillator frequency fLOl, and bandwidth BWm associated with secondary node 112-*m* can be centered about local oscillator frequency fLOm. Accordingly, each bandwidth BWj to BWm can shift depending on the frequency of each secondary node local oscillator laser 510. Tuning the local oscillator frequency, for example, by changing the temperature of the local oscillator laser 510 can result in corresponding shifts in the bandwidth to encompass a different group of subcarriers than were detected prior to such bandwidth shift. The temperature of the local oscillator laser 510 can be controlled with a thin film heater. Alternatively, the local oscillator laser can be frequency tuned by controlling the current supplied to the laser. The local oscillator laser 510 can be a semiconductor laser, such as a distributed feedback laser or a distributed Bragg reflector laser.

The maximum bandwidth or number of subcarriers that can be received, detected, and processed by an receiver 502, however, can be restricted based on hardware limitations of the various circuit components in receiver 502, as noted above, and, therefore, can be fixed. Accordingly, as noted above, the bandwidth associated with each secondary node 112 can be less than a bandwidth associated with primary node 110. Further, consistent with the present disclosure, the number of secondary nodes can be greater than the number of subcarriers output from primary node 110. In addition, the number of upstream subcarriers received by primary node 110 can be equal to the number of subcarriers transmitted by primary node 110 in the upstream direction. Alternatively, the number of subcarriers transmitted in the upstream direction collectively by secondary nodes 112 can less than or greater than the number of downstream subcarriers output from the primary node. Further, in another example, one or more of secondary nodes 112 can output a single subcarrier.

As shown in FIG. 5A, in some implementations, the bandwidths associated with secondary nodes 112 can overlap, such that, as further noted above, certain subcarriers SC can be detected by multiple secondary nodes 112. If the data associated with such subcarriers SC is intended for one of those secondary nodes, but not the other, switch circuitry, as noted above, can be provided in the secondary nodes to output the data selectively at the intended secondary node but not the others.

In some implementations, guard bands or frequency gaps can be provided between adjacent subcarriers SC. A guard band can be provided between subcarriers $SC_4$ and $SC_5$, and another guard band can be provided between subcarriers $SC_5$ and $SC_5$. Additional guard bands can be provided between remaining adjacent pairs of subcarriers. Such guard bands can be provided in order to detect and process each subcarrier more accurately by reducing crosstalk or other interference between the subcarriers.

As further shown in FIG. 5, switches or circuits SW-0 to SW-19 can be provided at the output of Rx DSP 550 to selectively output the data detected from the received subcarriers based on a respective one of control signals CNT-0 to CNT-19 output from control circuit 571, which, like control circuit 171 noted above can include a microprocessor, FPGA, or other processor circuit. Control signals can designate the output of each respective switch. Accordingly, for example, if data carried by predetermined subcarriers is intended to be output at a particular secondary node 112, switches SW at that secondary node can be configured, based on the received control signals CNT, to supply the desired data, but block data not intended for that node.

Figure 6:
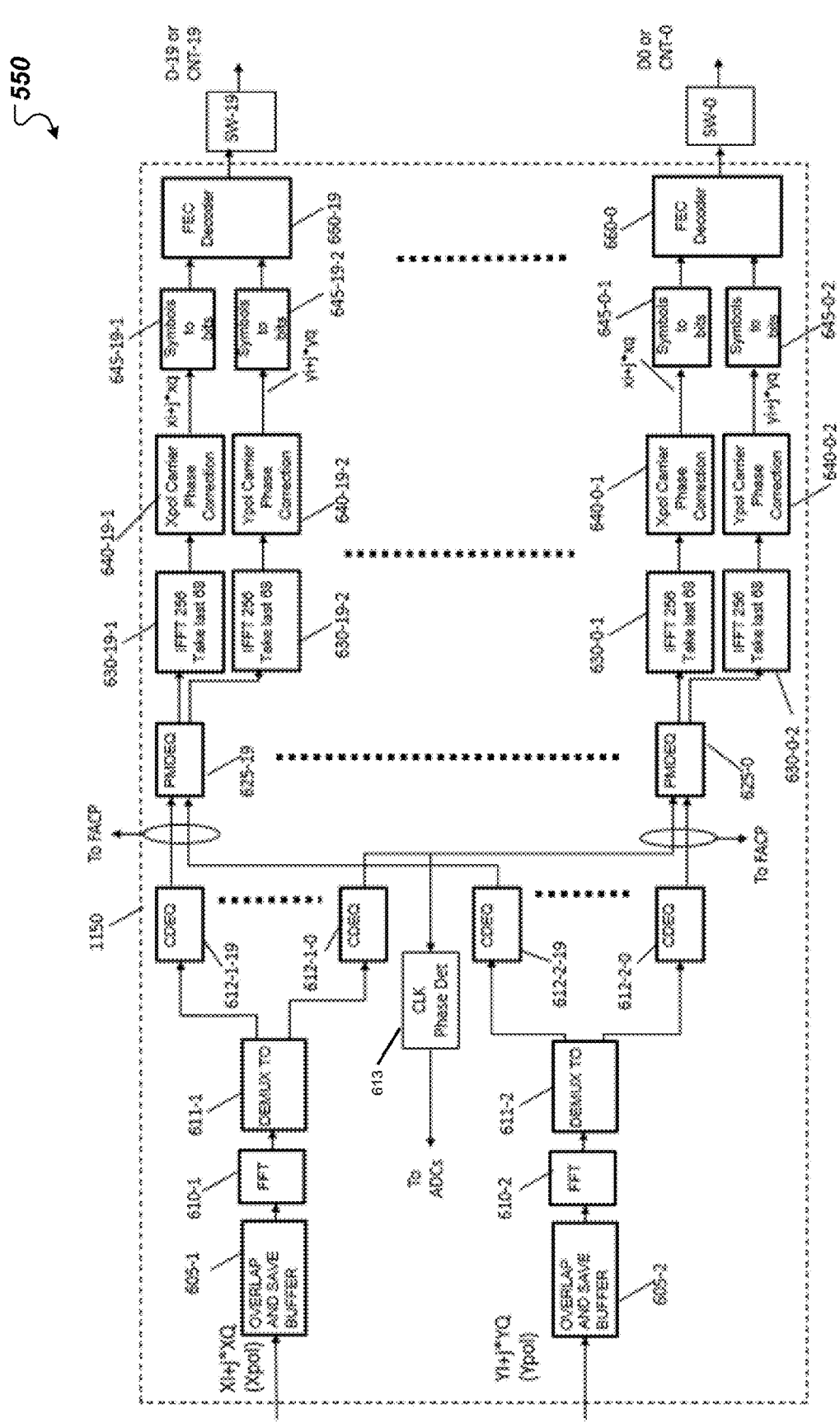
FIG. 6 depicts a block diagram of an example digital signal processor of the receiver shown in FIG. 5.

FIG. 6 illustrates exemplary components of the Rx DSP 550. As noted above, analog-to-digital (A/D) circuits 540-1 and 540-2 (FIG. 5) output digital samples corresponding to the analog inputs supplied thereto. In one example, the samples can be supplied by each A/D circuit at a rate of 64 GSamples/s. The digital samples may correspond to symbols carried by the X polarization of the optical subcarriers and can be represented by the complex number XI+jXQ. The digital samples can be provided to overlap and save buffer 605-1, as shown in FIG. 6. FFT component or circuit 610-1 can receive the 2048 vector elements from the overlap and save buffer 605-1 and convert the vector elements to the frequency domain using, for example, a fast Fourier transform (FFT). The FFT component 610-1 can convert the 2048 vector elements to 2048 frequency components, each of which can be stored in a register or "bin" or other memory, as a result of carrying out the FFT.

The frequency components can be demultiplexed by demultiplexer 611-1, and groups of such components can be supplied to a respective one of chromatic dispersion equalizer circuits CDEQ 612-1-0 to 612-1-19, each of which can include a finite impulse response (FIR) filter that corrects, offsets or reduces the effects of, or errors associated with, chromatic dispersion of the transmitted optical subcarriers. Each of CDEQ circuits 612-1-0 to 612-1-19 supplies an output to a corresponding polarization mode dispersion (PMD) equalizer circuit 625-0 to 625-19 (which individually or collectively can be referred to as 625). Without loss of generality, PMD equalizer can be done in frequency domain as shown in FIG. 6 or it can be done in time domain after IFFT 630 and before carrier phase correction 640.

Digital samples output from A/D circuits 540-2 associated with Y polarization components of subcarrier SC1 can be processed in a similar manner to that of digital samples output from A/D circuits 540-1 and associated with the X polarization component of each subcarrier. Namely, overlap and save buffer 605-2, FFT 610-2, demultiplexer 611-2, and CDEQ circuits 612-2-0 to 612-2-19 can have a similar structure and operate in a similar fashion as buffer 605-1, FFT 610-1, demultiplexer 611-1, and CDEQ circuits 612-1-0 to 612-1-19, respectively. For example, each of CDEQ circuits 612-2-0 to 612-19 can include an FIR filter that corrects, offsets, or reduces the effects of, or errors associated with, chromatic dispersion of the transmitted optical subcarriers. In addition, each of CDEQ circuits 612-2-0 to 612-2-19 provide an output to a corresponding one of PMDEQ 625-0 to 625-19.

As further shown in FIG. 6, the output of one of the CDEQ circuits, such as CDEQ 612-1-0 can be supplied to clock phase detector circuit 613 to determine a clock phase or clock timing associated with the received subcarriers. Such phase or timing information or data can be supplied to ADCs 540-1 and 540-2 to adjust or control the timing of the digital samples output from ADCs 540-1 and 540-2.

Each of PMDEQ circuits 625 can include another FIR filter that corrects, offsets or reduces the effects of, or errors associated with, PMD of the transmitted optical subcarriers. Each of PMDEQ circuits 625 can supply a first output to a respective one of IFFT components or circuits 630-0-1 to 630-19-1 and a second output to a respective one of IFFT components or circuits 630-0-2 to 630-19-2, each of which can convert a 256-element vector, in this example, back to the time domain as 256 samples in accordance with, for example, an inverse fast Fourier transform (IFFT).

Time domain signals or data output from IFFT 630-0-1 to 630-19-1 are supplied to a corresponding one of Xpol carrier phase correction circuits 640-0-1 to 640-19-1, which can apply carrier recovery techniques to compensate for X polarization transmitter (e.g., laser 108) and receiver (e.g., local oscillator laser 510) linewidths. In some implementations, each carrier phase correction circuit 640-0-1 to 640-19-1 can compensate or correct for frequency and/or phase differences between the X polarization of the transmit signal and the X polarization of light from the local oscillator 510 based on an output of Xpol carrier recovery circuits 640-0-1 to 640-19-1, which performs carrier recovery in connection with one of the subcarrier based on the outputs of IFFTs 630-0-1 to 630-19-1. After such X polarization carrier phase correction, the data associated with the X polarization component can be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 625 can be updated based on the output of at least one of carrier phase correction circuits 640-0-1 to 640-19-01.

In a similar manner, time domain signals or data output from IFFT 630-0-2 to 630-19-2 are supplied to a corresponding one of Ypol carrier phase correction circuits 640-0-2 to 640-19-2, which can compensate or correct for Y polarization transmitter (e.g., laser 108) and receiver (e.g., local oscillator laser 510) linewidths. In some implementations, each carrier phase correction circuit 640-0-2 to 640-19-2 also can correct or compensate for frequency and/or phase differences between the Y polarization of the transmit signal and the Y polarization of light from the local oscillator 510. After such Y polarization carrier phase correction, the data associated with the Y polarization component can be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 640-0-2 to 640-19-2 can be used to update the taps of the FIR filter included in one or more of PMDEQ circuits 625 instead of, or in addition to, the output of at least one of the carrier recovery circuits 640-0-1 to 640-19-1.

The equalizer, carrier recovery, and clock recovery can be further enhanced by utilizing the known (training) bits that can be included in control signals CNT, for example by providing an absolute phase reference between the transmitted and local oscillator lasers.

Each of the symbols-to-bits circuits or components 645-0-1 to 645-19-1 can receive the symbols output from a corresponding one of circuits 640-0-1 to 640-19-1 and map the symbols back to bits. For example, each of the symbol-to-bits components 645-0-1 to 645-19-1 can demap one X polarization symbol, in a QPSK or m-QAM constellation, to Z bits, where Z is an integer. For dual-polarization QPSK modulated subcarriers, Z is two. Bits output from each of component 645-0-1 to 645-19-1 are provided to a corresponding one of FEC decoder circuits 660-0 to 660-19.

Y polarization symbols are output form a respective one of circuits 640-0-2 to 640-19-2, each of which has the complex representation yi+j*yq associated with data carried by the Y polarization component. Each Y polarization, like the X polarization symbols noted above, can be provided to a corresponding one of symbols-to-bits circuits or components (demappers) 645-0-2 to 645-19-2, each of which has a similar structure and operates in a similar manner as symbols-to-bits component 645-0-1 to 645-19-1. Each of circuits 645-0-2 to 645-19-2 can provide an output to a corresponding one of FEC decoder circuits 660-0 to 660-19.

Each of FEC decoder circuits 660 can remove errors in the outputs of symbol-to-bit circuits 645 using, for example, forward error correction. Such error corrected bits, which can include user data for output from secondary node 112, can be supplied to a corresponding one of switch circuits SW-0 to SW-19. As noted above, switch circuits SW-0 to SW-19 in each secondary node 112 can selectively supply or block data based on whether such data is intended to be output from the secondary node. In addition, if one of the received subcarriers' control information (CNT), such as information identifying switches SW that output data and other switches SW that block data, the control information can be output from one of the switches and, based on such control information, control circuit 571 in the secondary nodes to generate the control signals CNT.

Consistent with another aspect of the present disclosure, data can be blocked from output from Rx DSP 550 without the use of switches SW-0 to SW-19. In one example similar to an example described above, zero (0) or other predetermined values can be stored in frequency bins associated with the blocked data, as well as the subcarrier corresponding to the blocked data. Further processing described above of such zeroes or predetermined data by circuitry in Rx DSP 550 can result in null or zero data outputs, for example, from a corresponding one of FEC decoders 660. Switch circuits provided at the outputs of FFTs 610-1 and 610-2, like switch circuits SW described above in FIG. 2A, can be provided to selectively insert zeroes or predetermined values for selectively blocking corresponding output data from DSP 550. Such switches also can be provided at the output of or within demultiplexers 611-1 and 611-2 to selectively supply zero or predetermined values.

In another example, zeroes (0s) can be inserted in chromatic dispersion equalizer (CDEQ) circuits 612 associated with both the X and Y polarization components of each subcarrier. In particular, multiplier circuits (provided in corresponding butterfly filter circuits), like multiplier circuits M described above, can selectively multiply the inputs to the CDEQ circuit 612 by either zero or a desired coefficient. Multiplication by a zero generates a zero product. When such zero products are further processed by corresponding circuitry in DSP 550, e.g., corresponding IFFTs 630, carrier phase correction components 640, symbol-to-bits components 645, and FEC decoder 660, a corresponding output of DSP 550 will also be zero. Accordingly, data associated with a subcarrier SC received by a secondary node receiver 112, but not intended for output from that receiver, can be blocked.

If, on the other hand, capacity requirements change and such previously blocked data is to be output from a given secondary node receiver DSP 550, appropriately coefficients can be supplied to the multiplier circuits, such that at least some of the inputs thereto are not multiplied by zero. Upon further processing, as noted above, data associated with the inputs to the multiplier circuits and corresponding to a particular subcarrier SC is output from secondary node receiver DSP 550.

While FIG. 6 shows DSP 550 as including a particular number and arrangement of functional components, in some implementations, DSP 650 can include additional functional components, fewer functional components, different functional components, or differently arranged functional components.

Figure 7:
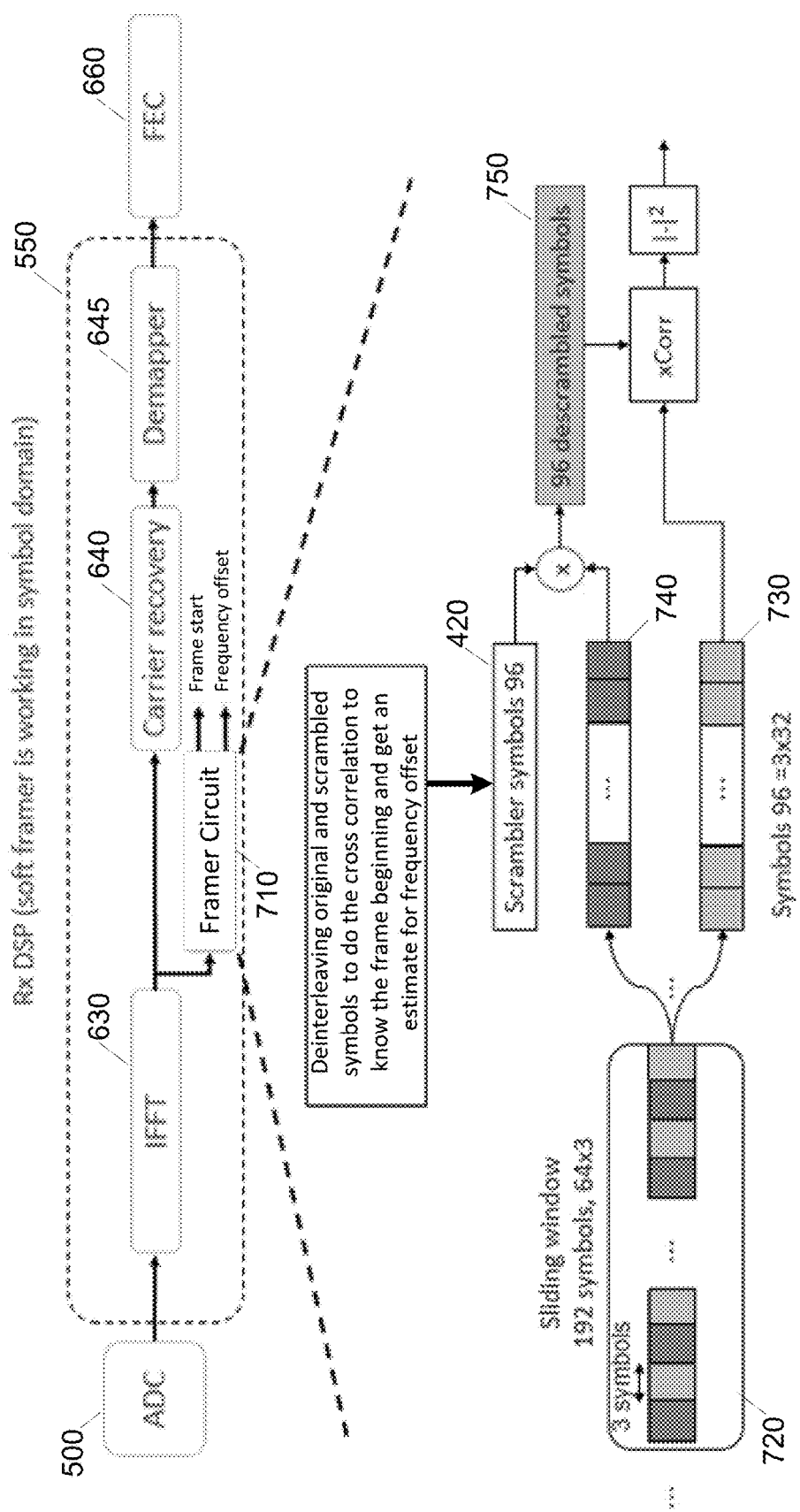
FIG. 7 depicts an example of a receiver digital signal processor that includes a framer circuit to deinterleave a received signal.

FIG. 7 depicts an example of a receiver Rx DSP 550 that includes a Rx framer circuit 710 to perform framer index and frequency offset estimation among various other functions. In general, the Rx framer circuit 710 can include hardware and/or software that can execute commands to implement the operations described in this specification. Instructions for executing one or more of these operations can be stored in a storage device integrated with, coupled to, or accessible by the Rx DSP 550. After the Rx DSP 550 obtains these instructions, the Rx framer circuit 710 can execute the operations according to the commands in the stored instructions in the manner described below.

The Rx framer circuit 710 can be placed in different parts of the Rx DSP 550. For instance, in some cases, e.g., when there is a single carrier, the Rx framer circuit 710 can be placed at the beginning of the Rx DSP 550 immediately after the ADCs 540. In some cases, e.g., when there is are multiple carriers, the Rxframer circuit 710 can be placed immediately after the DEMUX components or circuits 611. In both cases, single or multiple carriers systems, the Rx framer circuit 710 can be placed before the equalizer 612 when operating in the sample domain and after performing time domain conversion. When operating in the symbol domain, the Rx framer circuit 710 can be placed after the IFFT components or circuits 630.

Due do the flexibility of implementing the Rx framer circuit 710 in different parts of the Rx DSP 550, the Rxframer circuit 710 is not shown in FIG. 6. However, as an example, FIG. 7 depicts an instance in which the Rx framer circuit 710 is implemented after the IFFT components or circuits 630 perform time domain conversion.

As explained above with respect to FIGS. 5 and 6, a signal 501 can be received over an optical fiber link 501 or channel 310 and processed by Rx optics and A/D block 500. The output from the ADC 540 is fed to the Rx DSP 550 for further processing. The Rx framer circuit 710 can execute a framer index estimation algorithm that utilizes a sliding window 720 to process received symbols as shown in FIG. 7. The window 720 can be equal to the width of the header symbols inserted at the Tx side. For instance, in the example shown in FIG. 4, the frame header 920 has 192 symbols. The Rx DSP 550 can control the window 720 such that it slides one symbol at a time to process each symbol. While the window 720 is applied to the symbols, the received symbols can be temporarily stored in a buffer.

Symbols within the sliding window 720 can be deinterleaved every preset number of symbols, e.g., 3 symbols. The sequence of received symbols are deinterleaved into two symbol sequences (sequence 730 and sequence 740) to recover the original arrangement of framer symbols 410 and scrambled symbols 430, respectively, as implemented by the Tx DSP 102 (see FIG. 4). Sequence 740, which corresponds to a sequence of scrambled symbols 430, can then be multiplied by the same random number scrambler symbol sequence 420 used in the Tx DSP 102. The product of this multiplication operation is a set of descrambled symbols 750 that can be cross correlated with symbol sequence 730, which can correspond to framer symbols 410. In some implementations, the multiplication operation can be performed by multiplying symbol sequence 730 with scrambler symbol sequence 420 (instead of symbol sequence 740) and subsequently cross correlating the product with symbol sequence 740.

If the absolute square value of the determined cross correlation is greater than a threshold, the Rx DSP 550 saves the shift index of the window 720, the resulting complex value of the cross correlation, and the absolute square value of the determined cross correlation as a new maximum cross correlation value. The Rx DSP 550 can then shift the slide window 720 by one symbol and repeat the operations performed by the Rx framer 710 until all the symbols have been processed. The absolute square values of the determined cross correlation at the different symbol positions/locations can then be aggregated so that information regarding the cross correlation across all the symbols in a frame or frame header 920 can be obtained.

Figure 10:
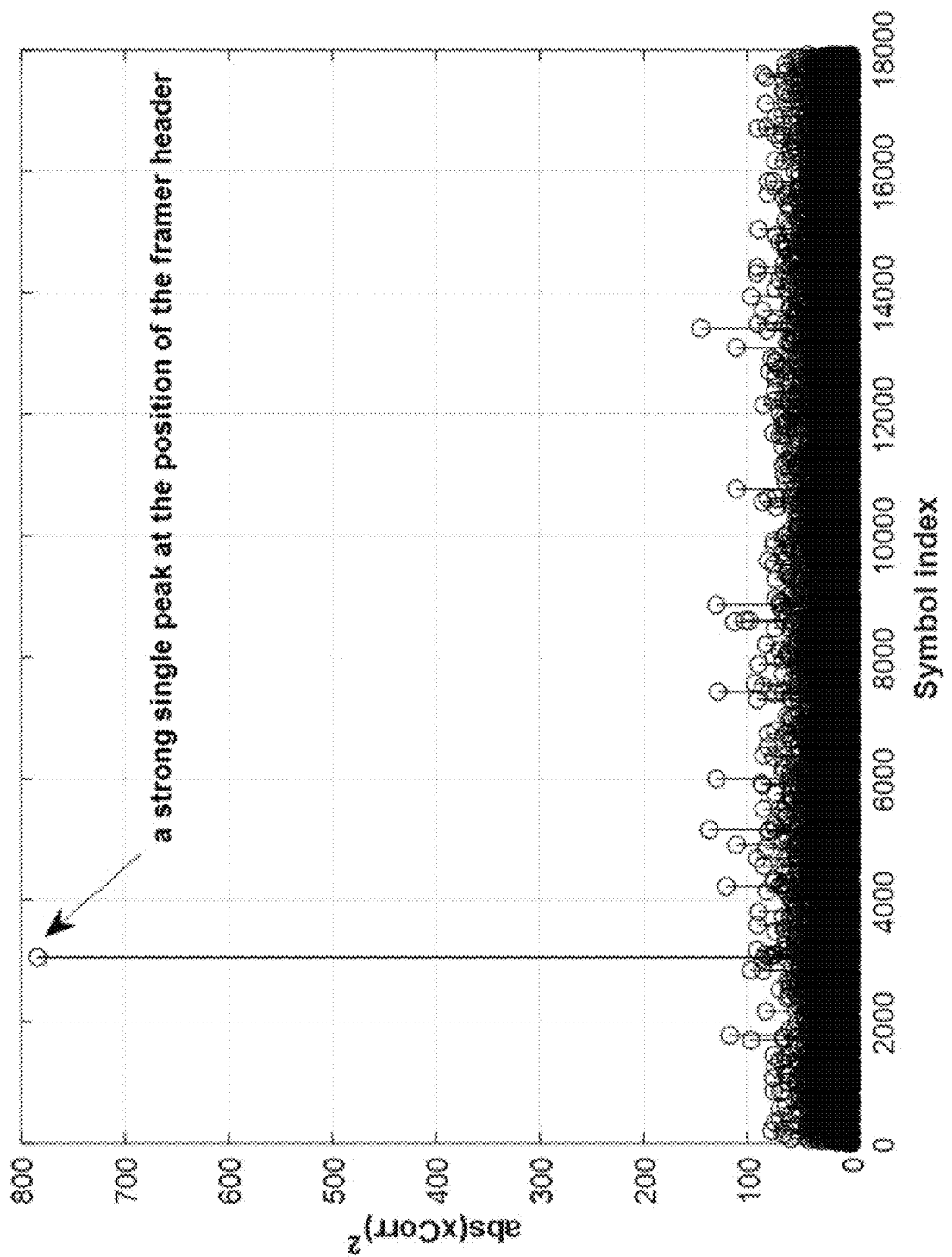
FIG. 10 depicts an example graph of an absolute square value of a cross correlation as a function of the symbol index.

FIG. 10 displays an example graph of the determined absolute square value of the cross correlation (y-axis) as a function of the symbol index (x-axis). As can be seen in FIG. 10, the determined absolute square value can have several different values across the numerous symbols in a received signal, e.g., 18,000 symbols are shown in FIG. 10. However, the absolute squared value of the cross correlation will generate a single strong peak at the position of the framer header at which the sliding window 720 fits exactly the framer header 920 indicating that the sliding window 720 is located at the starting position of the framer header 920. The remaining absolute squared value values do not have a particular pattern, and, consequently, their cross-correlation values can average out to a small value (e.g., close to zero). If the length L of the frame header 920 is long enough, the chance of getting similar or stronger absolute square value anywhere other than the start of the frame header 920 is negligible.

In some implementations, after detecting the highest peak in the determined absolute square values of the cross correlation, a value of the highest peak can be compared to a threshold level to determine if the highest peak value satisfies (e.g., greater than) the threshold level. If the highest peak value satisfies the threshold level, the location (e.g., symbol index position) at which the highest peak value occurs is determined as a starting position of the frame header 920. In some implementations, if the highest peak value satisfies the threshold level, the Rx DSP 550 may stop sliding the sliding window 720 as the starting position of the frame header 920 has likely been determined.

By performing the operations depicted in FIG. 7, the Rx framer 710 can detect a peak in the determined absolute square values of the cross correlation operation and determine that the symbol index at which the peak is located corresponds to the beginning of a frame header, e.g., frame header 920. By identifying the beginning of the frame header 920, the Rx DSP 550 can synchronize processing of the received signal to the transmission of data by the transmitter 100.

For example, based on information of the starting position of the frame header 920, the Rx DSP 550 can then determine the position of all the following framer symbols 910, pilot symbols 820, and payload symbols 810 since the frame and payload structure is predefined. For example, the Rx DSP 550 can utilize information it possess according to the agreement between the receiver Rx 502 and transmitter 100 that specifies the distance or number of symbols, e.g., 31 symbols, separating each pilot symbol 820. By knowing the location of the starting pilot symbol 820, the Rx DSP 550 can determine the position of each pilot symbol being located every 32 symbols from the preceding pilot symbol. In some implementations, the location of the symbols relative to the starting point of the frame header 920 can also be provided in LUT.

Non-Linear Filtering

The foregoing description described, in part, how the beginning of a frame and, more generally, the location of a frame header in transmitted data can be estimated (hereinafter referred to as framer index estimation) when a single frame is being processed. In practice though, data transmissions can include multiple transmitted data frames. When multiple frames are transmitted, the Rx DSP 550 can perform additional processing to improve the accuracy of the framer index estimation.

To understand the issues when performing framer index estimation across multiple frames, consider a scenario in which the Rx DSP 550 begins processing symbols in a received data signal at an arbitrary position to search for the framer index. The Rx DSP 550 can perform the operations described above with respect to FIGS. 5-7 for multiple consecutive frames, e.g., 10 frames. The Rx DSP 550 can determine the framer index for 9 out of 10 frames correctly, e.g., at index position 300, within a certain accuracy threshold (e.g., ±2 symbols). However, for one of the frames, an error due, for example to noise, can cause the Rx DSP 550 to determine the framer index at index position 90,000. When the results are averaged across all 10 frames, the incorrectly determined framer index has a substantial effect on the calculated average value resulting in an incorrect shift of the average index position away from the correct index position, e.g., index position 300.

To address such problems when performing framer index estimation across multiple frames, in some implementations, the Rx DSP 550 can first determine the positions of the framer indices across multiple frames. Then, using a non-linear filter, positions that are outliers, e.g., greater than a threshold distance away from the median or mode framer index position across the multiple frames, can be removed. The remaining index position values can be averaged and generally yield a framer index position that is more accurate then determining a framer index position based on a single frame.

Figure 11:
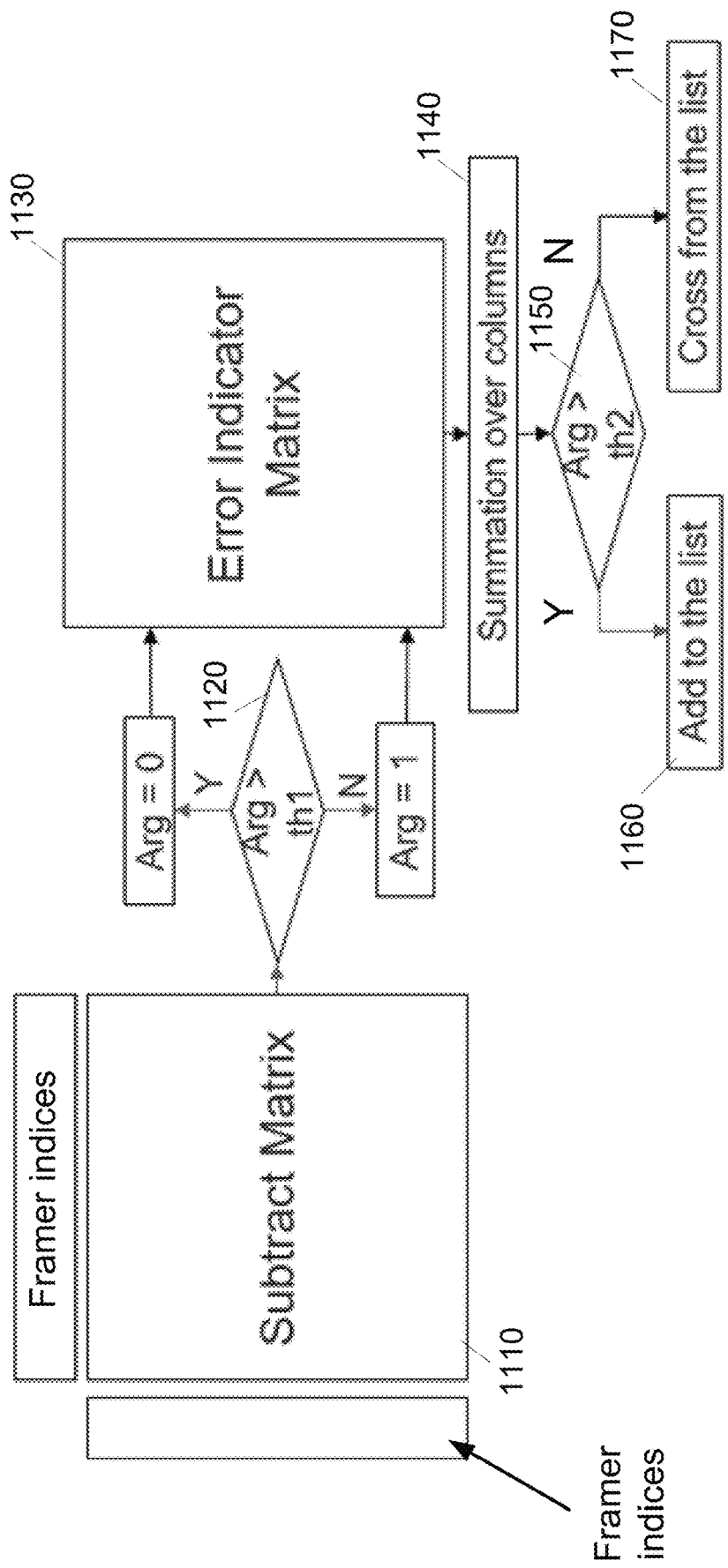
FIG. 11 depicts a diagram for implementing non-linear filtering.

An example of implementing non-linear filtering to improve the framer index estimate is shown in FIG. 11. In the implementation depicted in FIG. 11, the Rx DSP 550 can perform the operations described above with respect to FIGS. 5-7 to determine the estimated framer index position indices for multiple consecutive frames. The estimated indices can be placed horizontally and vertically in a grid-like manner and subtracted from each other to generate a Subtract Matrix 1110 as shown in FIG. 11. Each element of the Subtract Matrix 1110 is compared against a subtraction threshold value th1 1120, and the result is stored in an Error Indicator Matrix 1130. For example, an element from row i, column j of the Subtract Matrix 1110 can be compared to the subtraction threshold th1 1120 and if the element is greater than the subtraction threshold th1 1120, a zero is placed in row i, column j of the Error Indicator Matrix 1130. If an element from row i, column k of the Subtract Matrix 1110 is compared to a subtraction threshold th1 1120 and the element is less than or equal to the subtraction threshold th1 1120, a one is placed in row i, column k of the Error Indicator Matrix 1130.

Next, the Rx DSP 550 can determine the sum 1140 of each column of the Error Indicator Matrix 1130. If the sum for a column is greater than a summation threshold th2 1150, the index corresponding to the sum of a particular column is added to the list of acceptable estimated indices. If the sum for a column is less than or equal to a summation threshold th2 1150, the index corresponding to the sum of a particular column is removed from the list of acceptable estimated indices.

After this step is completed for each column of Error Indicator Matrix 1130, the estimated indices for multiple frames on the list of acceptable estimated indices can be averaged to determine the estimated framer index across the multiple frames. In some implementations, the summation 1140 operation can be performed by determining the sum 1140 of each row of the Error Indicator Matrix 1130 (instead of each column) and repeating the subsequent operations 1150, 1160, 1170.

Lock Indicator

A framer index lock indicator is another feature that can improve framer index estimation. In general, when multiple frames are transmitted in a stream of data, the frame header position in the multiple frames is fixed. However, in processing the data at the receiver 502, the Rx DSP 550 can not always determine the same position for the frame header position across the multiple frames. The ability to consistently and accurately estimate the framer index can be a performance indicator of a receiver.

Figure 12:
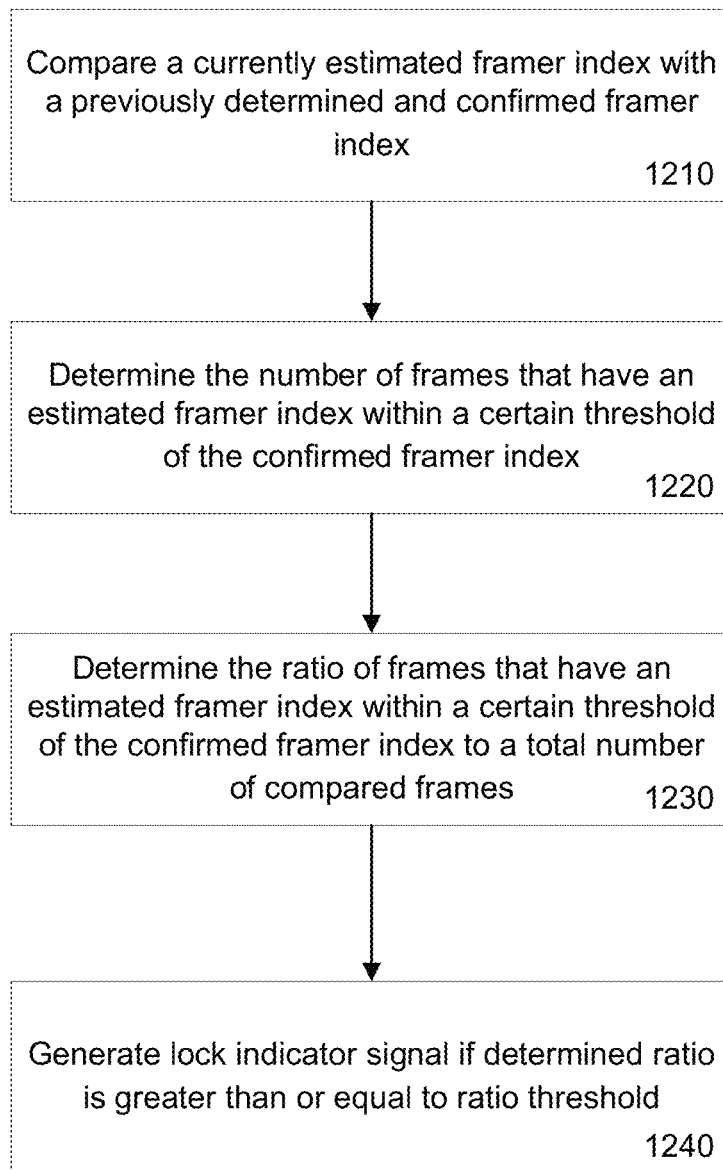
FIG. 12 depicts a flowchart for generating a framer index lock indicator

FIG. 12 illustrates a flowchart of operations that can be performed by the Rx framer circuit 710 or the Rx DSP 550 to address the uncertainty in estimating the framer index across multiple frames. In one operation (1210), the estimated framer index from a frame being processed by the Rx framer 710 can be compared against a framer index previously determined and confirmed as being within a threshold of the actual location of the framer index as transmitted. This comparison can be repeated for multiple frames. The Rx framer 710 can determine the number of frames that have an estimated framer index within a certain threshold of the confirmed framer index (1220). Next, the Rx framer 710 can determine the ratio of the number of these frames that have an estimated framer index within a certain threshold of the confirmed framer index to the total number of frames that have been compared (1230). The ratio is indicative of the quality of the framer index estimation. For example, the higher the ratio the greater the quality of the framer index estimation for a set of frames. The lower the ratio, the lower the quality of the framer index estimation for a set of frames.

In some implementations, the Rx DSP 550 can randomly select a set of frames from received data to determine the quality of the framer index estimation. In some implementations, the Rx DSP 550 can determine the quality of the framer index estimation after a determined period of time or periodically after a certain number of frames have been processed, e.g., after every 200,000 frames. In some implementations, the Rx DSP 550 can determine the quality of the framer index estimation in response to a trigger condition, such as the reception of a new stream of data.

When the ratio of the number of these frames that have an estimated framer index within a certain threshold of the confirmed framer index to the total number of frames that have been compared is greater than or equal to a ratio threshold, the Rx framer 710 can generate a lock indicator signal or flag that indicates that a framer index estimation is being and can be reliably performed (1240). The lock indicator signal can be sent to other components of the Rx DSP 550. In some implementations, certain operations such as frequency offset estimation, as described in more detail, are only performed after the lock indicator signal has been generated. In some implementations, certain processing operations or storing of received data are not permitted until the lock indicator signal is generated. In some implementations in which a lock indicator flag is used, the lock indicator flag can be set to a first value, e.g., 1, to indicate that the determined ratio satisfied the ratio threshold, and to a second value, e.g., 0, to indicate that the determined ratio did not satisfy the ratio threshold.

Quantization and Sign Bit Processing

In communication systems, symbols can be transmitted over signals, e.g., pulse symbols, and each symbol can encode several bits, e.g., 7 or 10 bits. Consequently, the cross-correlation operation described above can involve a computationally intensive process. As an example, if each symbol encodes 10 bits and 96 descrambled symbols 750 are generated, the cross-correlation operation can involve doing a 10-bit by 10-bit correlation for 96×96 symbols, which could consume substantial system and computational resources.

Figure 13:
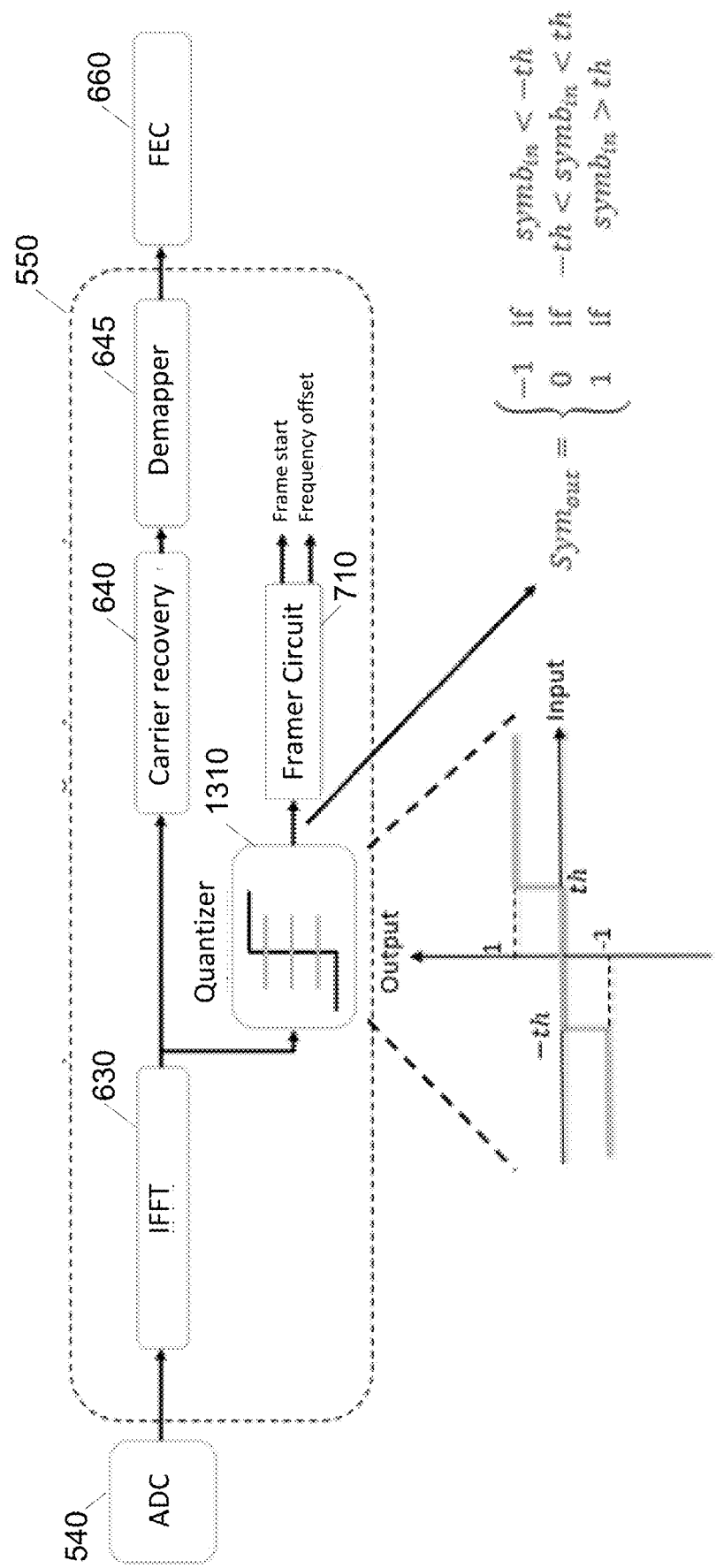
FIG. 13 depicts an example of quantizing symbols in a receiver digital signal processor.

To save system and computational resources, each symbol can be further quantized by a quantizer 1310, as shown in FIG. 13. The quantizer 1310 can execute various suitable quantization methods to further quantize the symbols which would then reduce the computation involved in performing the cross-correlation operation.

In the example shown in FIG. 13, a quantizer 1310 can be implemented immediately before the Rx framer circuit 710. If the Rx framer circuit 710 is implemented after the IFFT 630, then the quantizer 1310 can be implemented between the Rx framer circuit 710 and the IFFT 630.

FIG. 13 also depicts one example of quantizing the symbols. For instance, in FIG. 13, the quantizer 1310 can quantize the symbols to 3 levels (−1, 0, 1), although it can be configured to perform quantization for many different levels. The real and imaginary parts of a symbol are compared against the symbol threshold th. If the real or imaginary part is greater than the threshold th, the symbol can be quantized to 1. If the real or imaginary part is less than a negative threshold value −th, the symbol can be quantized to 1. If the real or imaginary part is equal to or between a positive threshold value th and a negative threshold value −th, the symbol can be quantized to 0.

In this manner, the 10-bit per symbol calculations have been reduced to 2-bit per symbol calculations. Furthermore, because the values for the quantization levels are −1, 0, and 1, simple and fast multiplication can be executed for cross correlation operations.

Frequency Offset Detection and Estimation

Figure 14:
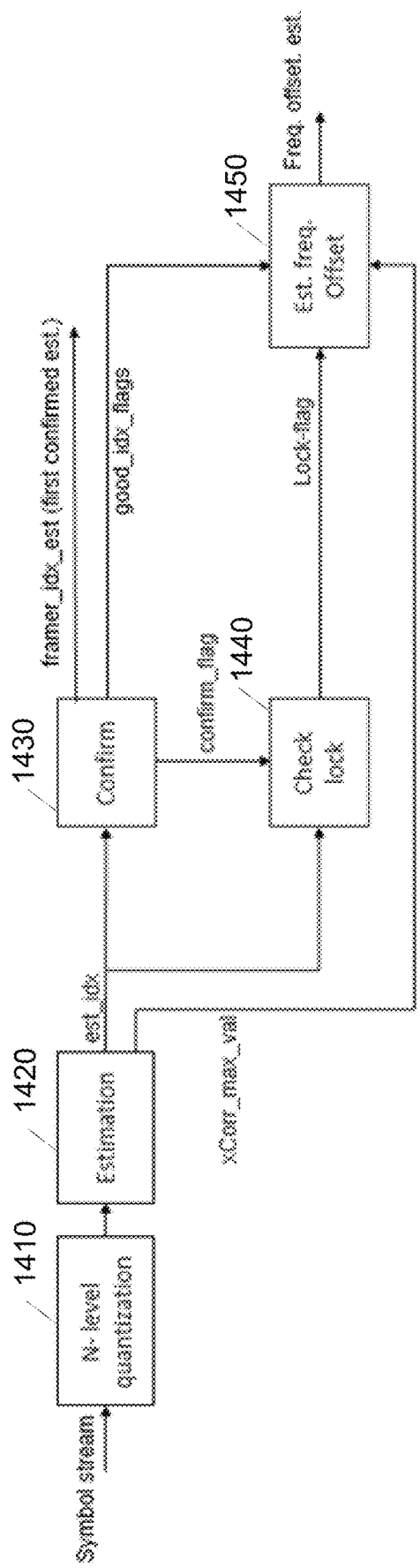
FIG. 14 depicts an example diagram of frequency offset detection and estimation.

FIG. 14 depicts an example of frequency offset detection and estimation using the above-described systems and methods within the Rx DSP 550. As shown in FIGS. 13 and 14, after some processing by the Rx DSP 550, e.g., by the IFFTs 630, a stream of symbols can be quantized 1310/1410 through a N-level quantization operation as described above with respect to claim 13. "N" can be a whole number and refers to the level of quantization. In the example shown in FIG. 13, a three level (N=3) quantization operation is performed to quantize the symbols to −1, 0, or 1. The quantized symbols can then be processed by the Rx framer circuit 710, which implements the receiver cross-correlation operations described with respect to FIG. 7, to estimate the framer index (est_idx). As part of the cross-correlation operations, the Rx framer 710 can also determine a complex cross correlation value at the position of the estimated framer index (xCorr_max_val).

The confirm block 1430 represents buffering and storing operations performed by the Rx framer circuit 710 and a buffer coupled to the Rx framer circuit 710. As explained above, framer index estimation can be performed over multiple frames. A confirm buffer can store data indicative of a fixed number of estimated framer indices. The Rx framer circuit 710 can perform filtering operations and generate a lock indicator signal (or set a lock indicator flag) indicative of the quality of the framer index estimation being performed across multiple frames.

For example, after a number of estimated framer indices have been determined, the Rx framer circuit 710 can perform the non-linear filtering operations, as described above with respect to FIG. 11, to determine and confirm the likely location of the framer index. The Rx framer circuit 710 can generate a framer_idx_est signal identifying the confirmed likely location of the framer index and set a confirm flag to 1 to indicate that the framer index location identified by the framer_idx_est signal is confirmed. The Rx framer circuit 710 can also generate good_idx_flags flags that indicate which estimated framer indices in the confirm buffer are valid and which framer indices are outliers and were not included while determining the likely location of the confirmed framer index.

When the confirm flag is set to 1 (e.g., confirm_flag=1), the Rx framer circuit 710 can initiate check lock operation 1440 that include the operations described above with respect to FIG. 12. For example, the Rx framer circuit 710 can determine the number of estimated framer indices that are close to the confirmed framer index within a certain threshold, and generate a lock indicator signal or set the lock indicator flag to a first value, e.g., 1.

Figure 19:
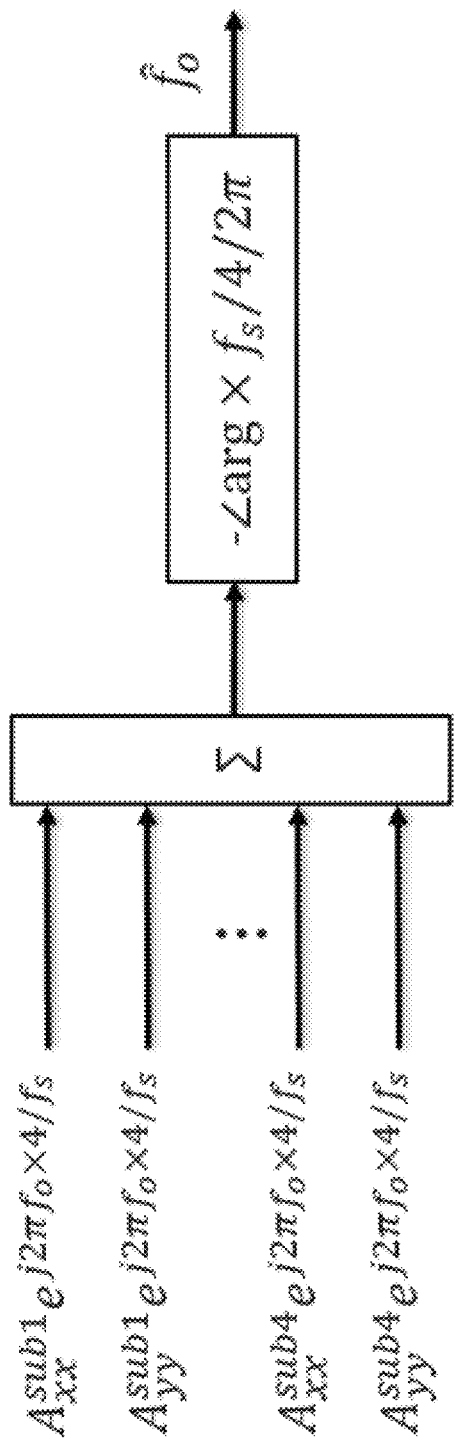
FIG. 19 depicts an example of estimating frequency offset for multiple subcarriers.

When the lock is complete, e.g., the lock indicator flag is set to the first value, e.g., 1, the estimated framer index has a very high probability of being accurate. The Rx framer circuit 710 can then calculate the frequency offset from the complex value of the cross correlation xCorr_max_val at the position of the peak of the latest processed frame if the good_idx_flags corresponding to a frame being processed is 1. In particular, a look up table (LUT) including different angles for different cross correlation xCorr_max_val values (also described below with respect to FIG. 17) can be created and stored in a storage unit, such as a database. The size of the LUT can depend on the cross correlation xCorr_max_val bitwidth. The frequency offset can then be calculated easily from the angle LUT. As an example, FIG. 19 shows that the frequency offset $\hat{f}_0$ can be calculated from the angle of the cross correlation xCorr_max_val. In particular, the cross correlation xCorr_max_val at the header position for each carrier or subcarrier can be represented by the expression $A_{xx/yy}e^{j2\pi f_0 \times 4f_s}$. In this example, the interleaving period is 4. The frequency offset estimation can vary according to the sampling frequency $f_s$ and interleaving period. When multiple subcarriers are being processed (e.g., in FIG. 19, data from four subcarriers sub1, sub2, sub3, and sub4 is being processed), the complex cross correlation value of selected subcarriers that have good_idx_flags=1 at the position of the framer index for the latest frame can be summed and averaged to estimate the frequency offset $\hat{f}_0$.

Half-Symbol Rectification

In communication systems, when a receiver receives a signal, the receiver can perform sampling, e.g., to digitize a received analog signal. Complications can arise though when processing symbols and there is a delay in transmission or reception of data. For instance, when symbols are received with a delay that is not a multiple integer factor of a symbol interval and only a single symbol is available during a sampling interval, a symbol can undesirably be sampled by a receiver system at a fractional (e.g., half) portion of the symbol interval. This can lead to incorrect sampling and can introduce errors with the processing of a received signal by the receiver.

Figure 15:
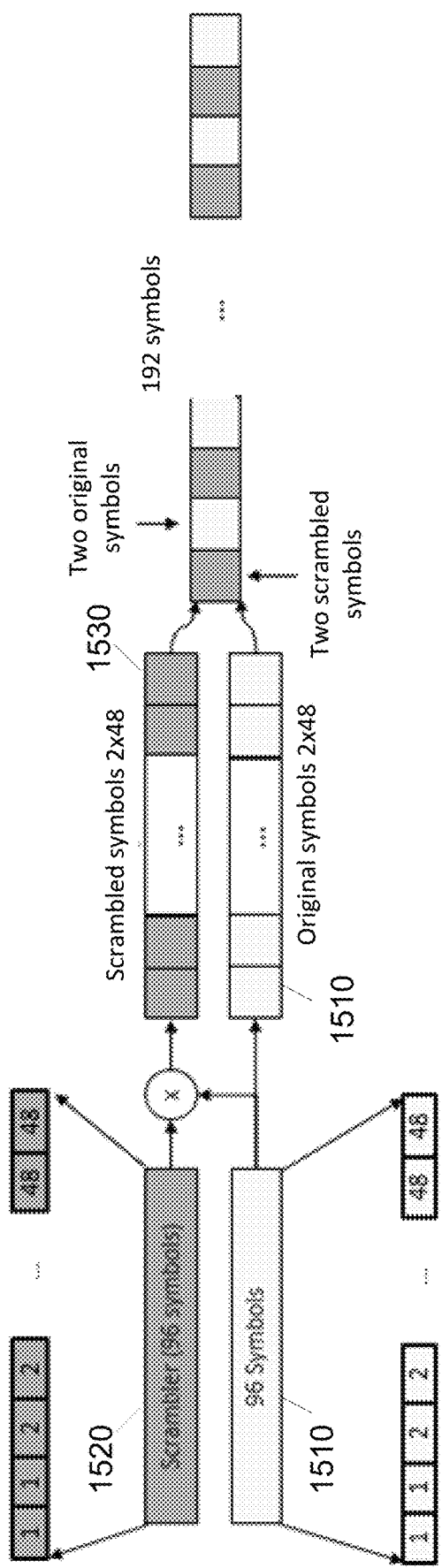
FIG. 15 depicts an example of interleaving symbols to compensate for half symbol delay.

A solution to the half symbol delay problem is shown in FIG. 15. As shown in FIG. 15, every two adjacent framer symbols are set identical and every two adjacent scrambler sequences are set identical along with interleaving scrambled and non-scrambled sequences for example every 2 symbols. The transmission of symbols in FIG. 15 is similar to the transmission of symbols described with respect to FIGS. 3 and 4 with a few differences.

In FIG. 4, a number of symbols, e.g., 96, are selected as the framer symbols 410. In FIG. 15, half the number of symbols, e.g., 48, are selected, duplicated, and then arranged in pairs to yield another set of 96 framer symbols 1510 although these framer symbols 1510 consist of 48 pairs of symbols.

Like the scrambler symbols 420 in FIG. 4, an equal number (96) of scrambler symbols 1520 having random values of 1 or −1 can be obtained and can be multiplied with each framer symbol. Half the number of scrambler symbols, e.g., 48, are selected, duplicated, and then arranged in pairs to yield another set of 96 scrambler symbols 1520. As shown in FIG. 15, a first processing path can include scrambled framer symbols 1530 that are the product of the multiplied scrambler symbols 1520 and pairs of framer symbols 1510. The initial framer symbols 1510 can occupy a second processing path. An interleaving operation can then be performed such that the scrambled framer symbols 1530 from the first processing path are interleaved with framer symbols 1510 from the second processing path.

The interleaving can be implemented in various ways. In some cases, the framer symbols 1510 and the scrambled framer symbols 1530 can be concatenated one after another. In some cases, the framer symbols 1510 and the scrambled framer symbols 1530 can be designated to be located an even and odd index positions in the sequence of pilots. In some cases, a fixed number of framer symbols 1510 are placed first followed by the same number symbols of the scrambled framer symbols 1530. This continues until all symbols from the two processing paths are consumed. The remaining transmitting steps such as the insertion of pilot symbols can be performed in the same way as described above with respect to FIGS. 3 and 4.

The half symbol rectification solution is also useful to address intersymbol interference (ISI) that could arise from Differential Group Delay (DGD). By duplicating each framer symbol so that the framer symbols 1510 are arranged in pairs, as shown in FIG. 15, effectively the interval for each symbol is doubled which can decrease issues arising from ISI or DGD.

In some implementations, to increase the DGD tolerance, the Tx DSP 102 can implement a course interleaver (as part of the Tx framer circuit 320). The course interleaver can interleave the scrambler symbols 1520 with the framer symbols 1510 by alternating between two sequences every three symbols. The sequence of scrambler symbols 1520 is also held identical for every three consecutive symbols. By alternating between two sequences every three symbols instead of alternating after every symbol or pair of symbols, the DGD tolerance can increase although there can be less tolerance against phase-noise and frequency offset.

Sampling Rate Compensation

Data from one transmitter 100 can be transmitted to different receivers that can respectively operate with different components and consequently have different sampling rates to sample received signals. When the Rx framer circuit 710 is situated towards the beginning of the Rx DSP 550 and performs some of the earlier processing steps of the Rx DSP 550, the framer index estimation by the Rx framer circuit 710 can be sensitive to any up-sampling if the sampling rate of the receiver 502 is too high. In practice, the sampling rate can often be higher than the symbol rate of transmitted signals. The higher sampling rate can cause misalignment between the number of samples and the actual number of symbols. To compensate for this misalignment, the Rx framer circuit 710 can apply a modified sliding window 720 to the interleaved symbols and a modified scrambler sequence to deinterleave the symbols.

Figure 16:
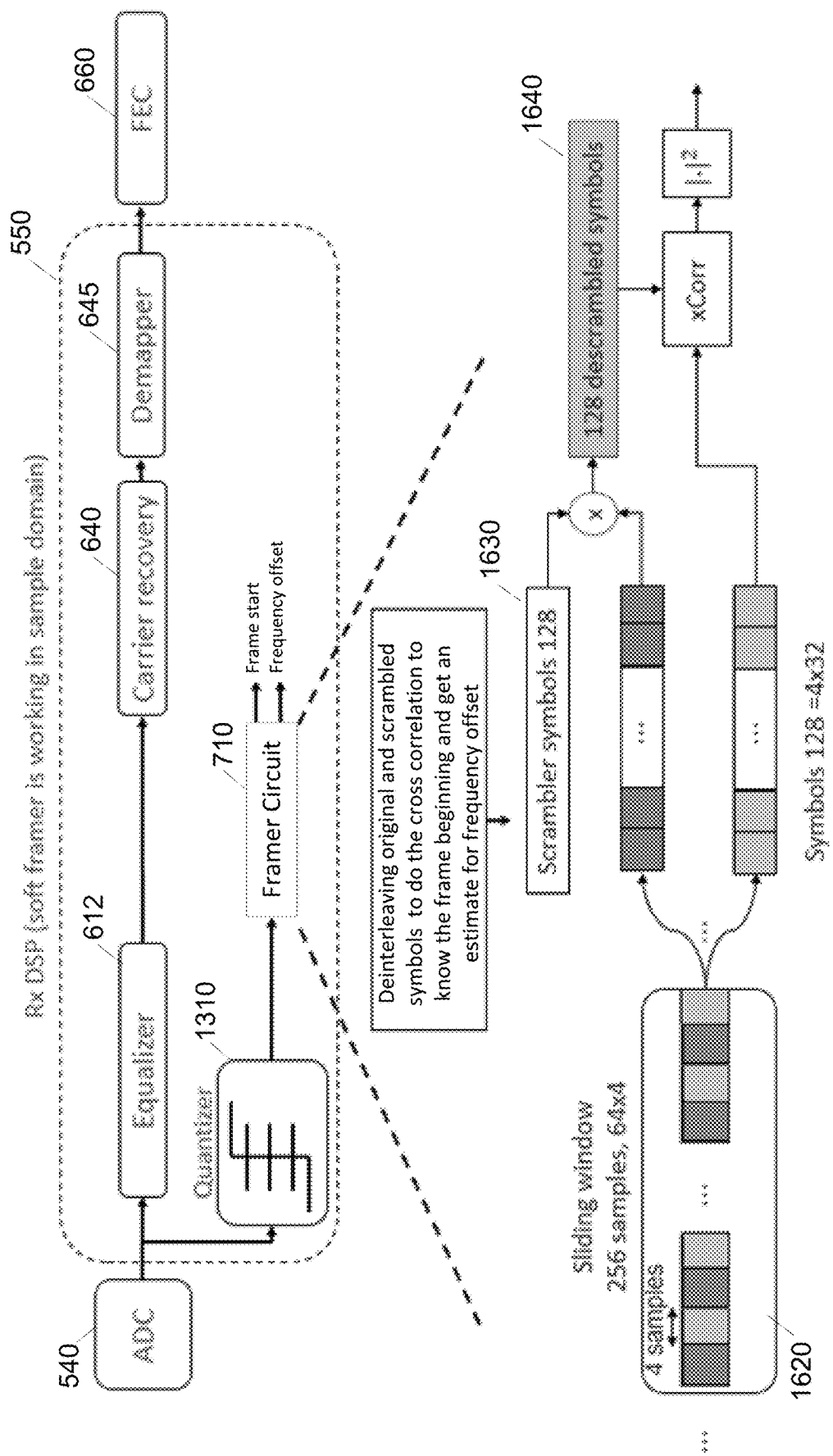
FIG. 16 depicts an example of a receiver digital signal processor that includes a framer circuit to deinterleave a received signal while compensating for upsampling.

As shown in FIG. 16, the quantizer 1310 and Rx framer circuit 710 are located towards the beginning of the Rx DSP 550 and can receive a sampled and digitized signal from the ADC 540. The quantizer 130 performs the quantization, e.g., 3-level quantization operation, as described above. In the configuration shown in FIG. 16, the sampling rate of the receiver 502 can be higher than the symbol rate. For example, the received signal can have been upsampled by a factor of 4/3, i.e., 4 samples for every 3 symbols. The Rx DSP 550 can be aware of the upsampling factor and can receive information regarding the frame header. For instance, the Rx DSP 550 can know that a framer header 920 of 192 symbols is used, as shown in the example of FIG. 4. Typically, the Rx DSP 550 can use a sliding window 720 that has the same symbol size as the frame header 920. However, because of the upsampling, using the same sized sliding window 720 can lead to errors in extracting the correct sequence of symbols.

Accordingly, to compensate for the upsampling, the Rx framer circuit 710 can resize the sliding window 1620 according to the upsampling factor. In this example, because the framer header 920 had a size of 192 symbols and the upsampling factor is 4/3, the modified size of the sliding window 1620 is 256 samples, which can be obtained by multiplying the previous sliding window size (or frame header size) by the upsampling factor (e.g., 192 symbols*(4 samples/3 symbols)=256 samples).

In addition to resizing the sliding window 1620, the Rx framer circuit 710 also modifies the size of the scrambler symbol sequence 1630 according to the upsampling factor to accommodate the larger number of samples. In particular, the modified size of the scrambler symbol sequence 1630 can be obtained by multiplying the previous size of the scrambler symbol sequence 420 by the upsampling factor (e.g., 96 symbols*(4 samples/3 symbols)=128 samples based on the examples above and in FIGS. 4 and 7).

As shown in FIG. 16, the sliding window 1620 has a size of 256 samples. The sliding window 1620 can be used to process the received samples and deinterleave them. The Rx framer circuit 710 can perform the deinterleaving in a similar to the process described above with respect to FIG. 7 except that the Rx framer circuit 710 alternates every 3 symbols (or 4 samples) of the framer symbols and every 3 symbols of the scrambled framer symbols. The 128 deinterleaved symbols can then be multiplied with an equal-sized scrambler symbol sequence 1630 to yield 128 descrambled symbols 1640 which can then be used to perform a cross correlation operation and to determine frequency offset and the framer index similar to the processes described above with respect to FIGS. 7, 11, 12, and 14.

Systems with Digital Subcarriers

In optical communication systems with digital subcarriers, data transmission from a transmitter 100 to a receiver 502 can often be performed through multiple independent subcarriers. When multiple subcarriers are used, the framing of symbols and detection of frame header can be performed per subcarrier in the manner described above. Consequently, transmitters 100 and receivers 502 can have multiple copies of a framer index. However, it is desirable for data received through all the subcarriers to be synchronized. Although data across the multiple subcarriers can be synchronized by the transmitter 100, it is possible that data received by the receiver 502 in the different subcarriers is compromised differently, e.g., data in different subcarriers can have different delay. In some implementations, the receiver 502 can include one or more circuits to synchronize multiple subchannels. This additional circuits can include a buffer, AND logic unit, and/or barrel shifter (not shown), and can be coupled to or incorporated within the Rx framer circuit 710 or the Rx DSP 550.

Figure 17:
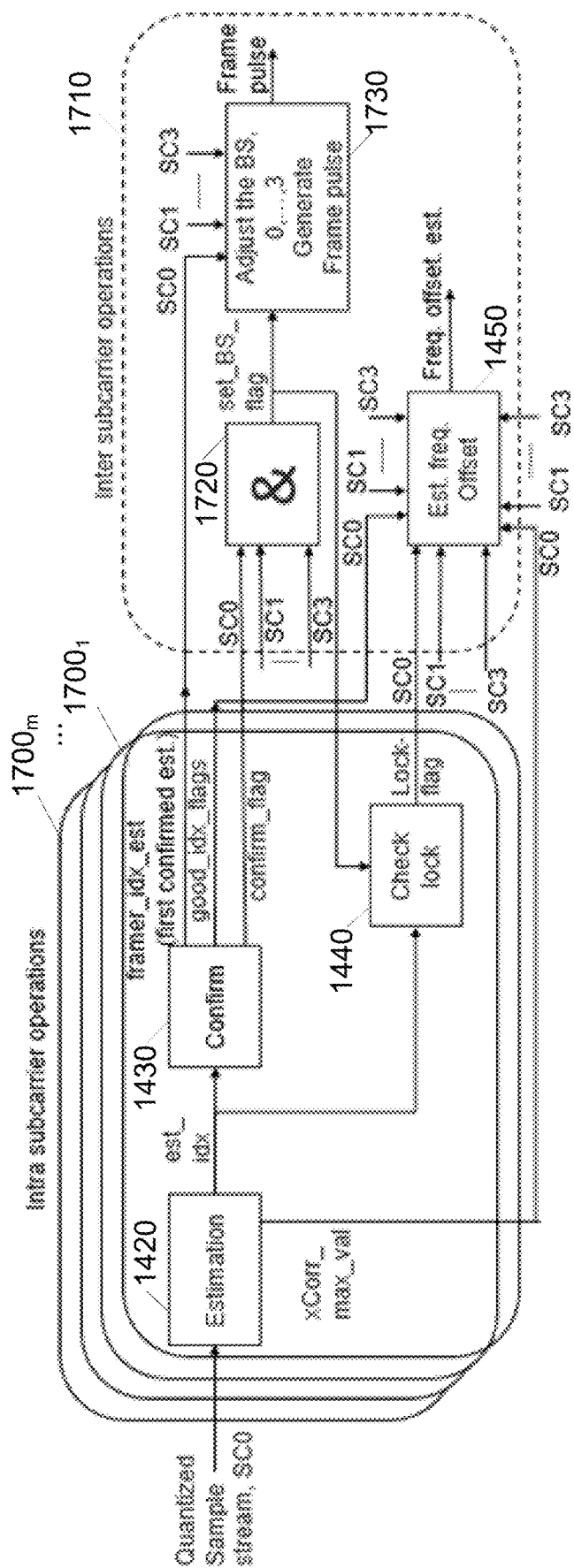
FIG. 17 depicts an example of performing frequency offset estimation with multiple digital subcarriers.

Recall from the frequency offset estimation example shown in FIG. 14 that a symbol stream can be quantized 1410 and estimation 1420, confirmation 1430, check lock 1440, and frequency offset estimation 1450 operations can be performed. In FIG. 14, these operations were described with respect to a single carrier. When multiple subcarriers are being processed, these operations are performed for each subcarrier. For example, FIG. 17 shows multiple operation blocks 1700₀-1700ₘ (m+1 being the number of subcarriers) that include operations 1420, 1430, and 1440 as described above with respect to FIG. 14 (the quantization operation 1410 is not shown but can be performed before the subcarrier operations are executed). The respective stream of symbols from each subcarrier is referred to as "$SC_0$" to "$SC_m$" and each block $1700_1$-$1700_m$ represents the frequency offset estimation operations performed for data received from each subcarrier 0-$m$, respectively. These operations can generate a framer index (est_idx), a complex cross correlation value at the position of the estimated framer index (xCorr_max_val), a lock indicator flag, a framer_idx_est signal, a confirm flag, and a good_idx_flags flag for each subcarrier in a similar manner to the operations described with respect to FIG. 14.

In the example shown in FIG. 17, there are four subcarriers and m ranges from 0 to 3. Block 1710 represents the inter subcarrier operations and depicts the operations that are performed across the various subcarriers. A buffer can receive and store one or more of the framer index estimation (framer_est_idx), the complex cross correlation value at the position of the estimated framer index (xCorr_max_val), the lock indicator flag, the confirm flag, and the good_idx_flags flag for each subcarrier $SC_0$, $SC_1$, $SC_2$, $SC_3$. The size of this buffer can be selected to accommodate the maximum expected delay of any of the subcarriers. The buffer can provide the confirm flags from each of the subcarriers to an AND logic unit, which performs an AND operation 1720.

The AND logic unit can output or set a set_BS_flag flag, which signals to the barrel shifter to perform a shifting operation 1730 (described in more detail below). The AND logic unit can set the set_BS_flag flag to zero if one or more of the subcarrier confirm flags has a zero value indicating that the framer index location associated with a particular subcarrier has not been confirmed (1720). The AND logic unit can set the set_BS_flag flag to one if all the subcarrier confirm flags have a one value indicating that the framer index location associated with a particular subcarrier has been confirmed (1720).

A barrel shifter can receive the output from the AND logic unit and is configured to perform a shift operation 1730 when the set_BS_flag flag has a value of one. The shift operation 1730 can compensate for delays experienced by the individual subcarriers, which would otherwise have an adverse impact on the synchronization of transmitted and received data.

In more detail, as data from the different subcarriers is processed and the positions of the frame headers 920 in the respective subcarriers is determined, the confirm flag and framer index estimation (framer_est_idx) data is written or stored in the buffer in the order the estimation is completed and confirm flags are set. The buffer can store order information indicative of the order in which each subcarrier's framer index estimation was completed and the positions of the frame headers 920 in the respective subcarriers. Due to, e.g., the delays that can occur in the transmission and reception of data in each subcarrier, the order in which each subcarrier's framer index estimation was completed can not be consistent with the order of data that was transmitted by the transmitter 100. This results in the receiver 502 being unsynchronized with the transmitter 100.

To address this delay problem, in response to receiving the set_BS_flag flag having a value of one, the barrel shifter can compensate the determined framer index estimation (framer_est_idx) for each subcarrier to make the framer index order the same or similar to the one implemented by the transmitter 100 (1730). In some implementations, to perform the compensation, the barrel shifter can instruct the buffer to output (e.g., when executing a read operation) the data regarding the frames in the order data was transmitted by the transmitter 100. For example, the read operation can start from the position of the estimated frame index for the subcarrier that was the first subcarrier across which the transmitter 100 transmitted data. After the first subcarrier, the read operation can continue to read data from the position of the estimated frame index for the second subcarrier across which the transmitter 100 transmitted data. This process is continued sequentially until data for all the subcarriers is read.

In FIG. 17, the check lock operation 1440 can start after all subcarriers $SC_0$-$SC_m$ confirmed on the estimated framer index for the corresponding subcarrier. The lock flag can be set to one or the lock indicator signal is generated when all the subcarriers $SC_0$-$SC_m$ declare lock independently (indicating that a framer index estimation is being and can be reliably performed). The frequency offset estimation operation 1450 is executed (described in part with respect to FIGS. 14 and 19) after receiving the lock indicator signal or in response to the lock flag being set to one. Since all subcarriers experience the same frequency offset, the estimated frequency offset from all subcarriers can be averaged to generate the final estimation of the frequency offset.

Chromatic Dispersion Estimation

Delays in different subcarriers can also be attributed to chromatic dispersion and noise. In particular, for communication systems with digital subcarriers, the relative offset between estimated framer indices for different subcarriers can be due to the effect of the chromatic dispersion and noise. In an ideal scenario with zero chromatic dispersion and negligible noise effect, the estimated framer indices across different subcarriers is the same. In a non-ideal scenario, the Rx framer circuit 710 can be used to estimate the chromatic dispersion. In some implementations, when the value of the chromatic dispersion is known, the relative delay between the framer indices of all the subcarriers $SC_0$-$SC_m$ can be estimated and used as an approximate value to compensate the framer index estimations determined by the Rx framer circuit 710. When the value of the chromatic dispersion is not known, the chromatic dispersion (CD) effect and delay can be determined using Equations 1 and 2.

$$\beta_2 = \frac{D\lambda^2}{4\pi c} \times 10^{-21} \qquad \text{Equation 1}$$

$$\text{delay} = -4\pi \times f_c \times \beta_2 \times f_b \times \mu \qquad \text{Equation 2}$$

$f_b$ is the subcarrier baud rate; $f_c$ is the center frequency of the subcarrier; $\lambda$ is the laser wavelength in nanometers (nm); D is the dispersion in picoseconds (ps)/nm; c is the speed of light through fiber; and $\mu$ is the number of samples per symbol (up sampling factor).

Figure 18:
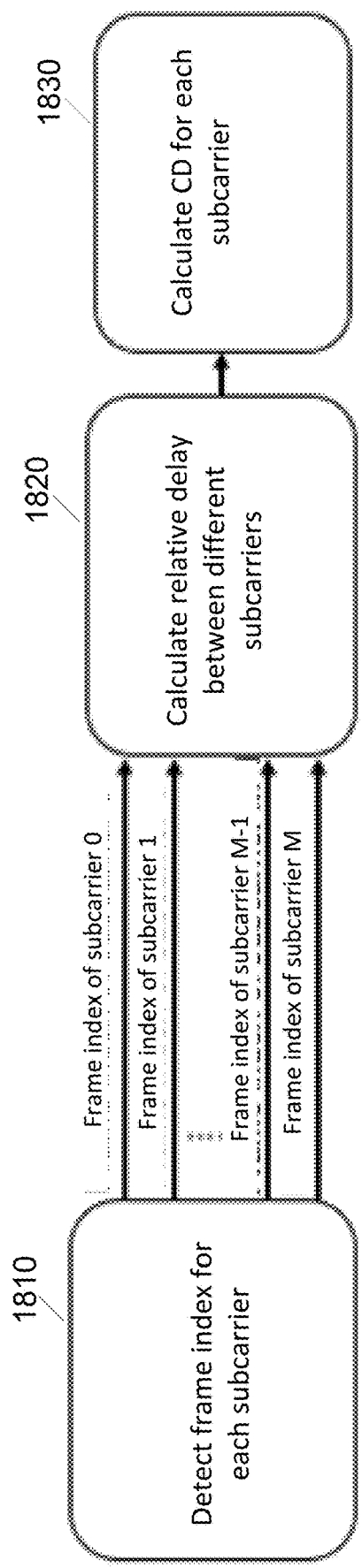
FIG. 18 depicts an example of estimating chromatic dispersion effect in multiple subcarriers.

FIG. 18 depicts operations performed to estimate the chromatic dispersion. As shown in FIG. 18, an operation 1810 to estimate the framer index for multiple subcarriers $SC_0$-$SC_M$ is performed in a similar manner as described above. Information from the estimated framer indices for the multiple subcarriers $SC_0$-$SC_M$ can then be used to calculate the delay and CD effect for the subcarriers in operations 1820 and 1830 using Equations 1 and 2. An example of these calculations is provided below.

For instance, in a communication system with eight (8) subcarriers centered at center frequencies $f_c$=[−7, −5, −3, −1, 1, 3, 5, 7]×4e9 HZ, with baud rate $f_b$=8e9 HZ, up sampling factor $\mu$=4/3. If the chromatic dispersion D=10000 ps/nm is known, the relative delay between subcarriers in terms of number of samples is calculated as delay=[11.9674, 8.5481, 5.1289, 1.7096, −1.7096, −5.1289, −8.5481, −11.9674]

which can be rounded to delay=[12, 9, 5, 2, −2, −5, −9, −12]

Having the set of integer delays, the estimated CD is [12534, 13161, 12186, 14623, 14623, 12186, 13161, 12534] with average value equal to 13,126 ps/nm. The coefficients of the CDEQ equalizer circuits 612 in the Rx DSP 550 can then be tuned according to the estimated CD to compensate for the CD effect.

While this specification contains many specifics, these should not be construed as limitations on the scope of the disclosure or of what can be claimed, but rather as descriptions of features specific to particular implementations. Certain features that are described in this specification in the context of separate implementations can also be combined. Conversely, various features that are described in the context of a single implementation can also be implemented in multiple implementations separately or in any suitable subcombination. Moreover, although features can be described above as acting in certain combinations and can even be claimed as such, one or more features from a claimed combination can, in some cases, be excised from the combination, and the claimed combination can be directed to a sub-combination or variation of a sub-combination. For example, the separation of various system components in the implementations described above should not be understood as requiring such separation in all implementations.

Terms used herein and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims can contain usage of the phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together. The term "and/or" is also intended to be construed in this manner.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget can be described as having a first side and a second widget can be described as having a second side. The use of the term "second side" with respect to the second widget can be to distinguish such side of the second widget from the "first side" of the first widget and not to connote that the second widget has two sides.

What is claimed is:

1. An apparatus comprising:
a mapper operable to map data bits to a first set of symbols;
processor circuitry operable to:
obtain the first set of symbols;
generate a third set of symbols by mixing the first set of symbols with a second set of symbols;
interleave the first set of symbols with the third set of symbols;
generate a frame header including the interleaved first set of symbols and the interleaved third set of symbols; and
generate a frame including the frame header and a payload, the frame header being appended to the payload that includes at least a portion of the first set of symbols; and
a transmitter circuit coupled to the processor circuitry and operable to output a modulated optical signal carrying information indicative of the frame.

2. The apparatus of claim 1, wherein the transmitter circuit includes:
a laser operable to provide a first optical signal; and
a modulator operable to receive the first optical signal and output a modulated second optical signal to enable provisioning of the modulated optical signal.

3. The apparatus of claim 1, wherein:
the frame header is appended at a starting position of the frame and before the payload in the frame;
the first set of symbols includes framer symbols; and
the second set of symbols comprises a random sequence of symbols having a magnitude of 1 or −1.

4. The apparatus of claim 1, wherein to interleave the first set of symbols with the third set of symbols, the processor circuitry is operable to sequentially arrange symbols from the first set of symbols and symbols from the third set of symbols in an alternating manner.

5. The apparatus of claim 1, wherein to generate the frame header, the processor circuitry is operable to:
designate a first symbol of the interleaved first set of symbols as a pilot symbol; and
designate each symbol occurring after a predetermined interval of symbols in the interleaved first set of symbols and the interleaved third set of symbols after the first symbol as a pilot symbol.

6. The apparatus of claim 1, wherein to generate the frame header, the processor circuitry is operable to:
insert a pair of pilot symbols at a beginning of the interleaved first set of symbols and the interleaved third set of symbols; and
insert additional pairs of pilot symbols after a predetermined interval of symbols after the pair of pilot symbols located at the beginning of the interleaved first set of symbols and the interleaved third set of symbols.

7. The apparatus of claim 1, wherein the processor circuitry is operable to:
insert a first pilot symbol at a beginning of the payload;
insert pilot symbols after a predetermined interval of symbols after the first pilot symbol; and
configure the frame to include the payload and the inserted pilot symbols.

8. An apparatus in accordance with claim 1, wherein the modulated optical signal includes a plurality of optical subcarriers.

9. An apparatus comprising:
a receiver circuit operable to receive a modulated optical signal carrying a frame of symbols, the frame of symbols including a frame header having header symbols and a payload having payload symbols, the receiver circuit being operable to provide an electrical signal based on the modulated optical signal; and
a processor circuitry operable to:
obtain the frame of symbols from the receiver circuit based on the electrical signal;
deinterleave a portion of the frame of symbols to separate a first set of symbols from a second set of symbols included in the frame of symbols;
generate a third set of symbols by mixing the first set of symbols with a fourth set of symbols;
determine a cross correlation of the third set of symbols and the second set of symbols; and
identify a starting position of the frame header in the frame of symbols based on a peak value associated with the cross correlation of the third set of symbols and the second set of symbols, the starting position being used to synchronize data associated with the frame of symbols with information output by a transmitter.

10. The apparatus of claim 9, wherein:
the receiver circuit includes a local oscillator laser that is operable to supply a local oscillator signal;
an optical hybrid circuit operable to receive polarization components of the modulated optical signal and the local oscillator signal, the optical hybrid circuit operable to supply mixing products; and
a photodiode circuit operable to receive the mixing products and output a signal corresponding to the electrical signal.

11. The apparatus of claim 9, wherein the processor circuitry is operable to:
apply a slide window having a fixed length to the portion of the frame of symbols;
determine the cross correlation of the third set of symbols and the second set of symbols when the slide window is applied to the portion of the frame of symbols;
apply the slide window to a second portion of the frame of symbols;
obtain a modified second set of symbols and a modified third set of symbols after applying the slide window to the second portion of the frame of symbols; and
determine a second cross correlation of the modified third set of symbols and the modified second set of symbols; and
wherein the second portion of the frame of symbols is shifted one symbol relative to the portion of the frame of symbols.

12. The apparatus of claim 11, wherein the processor circuitry is operable to:

determine a first absolute squared value of the cross correlation of the third set of symbols and the second set of symbols when the slide window is applied to the portion of the frame of symbols;

determine a second absolute squared value of the second cross correlation when the slide window is applied to the second portion of the frame of symbols; and aggregate the first absolute squared value of the cross correlation and the second absolute squared value of the second cross correlation.

13. The apparatus of claim 12, wherein to identify a starting position of the frame header in the frame of symbols based on the peak value, the processor circuitry is operable to identify a highest value of aggregated absolute squared values of the cross correlation comprising the first absolute squared value of the cross correlation and the second absolute squared value of the second cross correlation.

14. The apparatus of claim 9, wherein to identify a starting position of the frame header in the frame of symbols based on the peak value, the processor circuitry is operable to:
identify a highest value of the cross correlation of the third set of symbols and the second set of symbols;
determine that the highest value satisfies a threshold level;
in response to determining that the highest value satisfies a threshold level, determine a position of a symbol corresponding to the highest value; and
determine the position of the symbol corresponding to the highest value as a starting position of the frame header.

15. The apparatus of claim 9, wherein:
the fourth set of symbols comprises a random sequence of symbols having a magnitude of 1 or −1.

16. The apparatus of claim 9, comprising:
a storage buffer to store the portion of the frame of symbols.

17. An apparatus comprising:
a transmitter including first circuitry operable to:
generate a first set of symbols representative of data to be transmitted;
generate a third set of symbols by mixing the first set of symbols with a second set of symbols;
interleave the first set of symbols with the third set of symbols;
generate a frame header based on the interleaved first set of symbols and the interleaved third set of symbols; and
transmit a frame comprising the frame header; and
a receiver including second circuitry operable to:
receive a second frame that includes a second frame header;
deinterleave the second frame header to separate a fourth set of symbols from a fifth set of symbols;
generate a seventh set of symbols by mixing the fourth set of symbols with a sixth set of symbols;
determine a cross correlation of the fifth set of symbols and the seventh set of symbols; and
determine a starting location of the second frame header by identifying a peak value associated with the cross correlation of the fifth set of symbols and the seventh set of symbols.

18. The apparatus of claim 17, wherein:
the first set of symbols comprises framer symbols; and
the each of the second set of symbols and the sixth set of symbols comprises a random sequence of symbols having a magnitude of 1 or −1.

19. The apparatus of claim 17, wherein the receiver is operable to:
apply a slide window having a fixed length to a portion of the second frame after receiving the second frame;
determine the cross correlation of the fifth set of symbols and the seventh set of symbols when the slide window is applied to the portion of the second frame;
apply the slide window to a second portion of the second frame;
obtain a modified fifth set of symbols and a modified seventh set of symbols after applying the slide window to the second portion of the second frame; and
determine a second cross correlation of the modified fifth set of symbols and the modified seventh set of symbols; and
wherein the second portion of the second frame is shifted one symbol from the portion of the second frame.

20. The apparatus of claim 19, wherein the receiver is operable to:
determine a first absolute squared value of the cross correlation of the fifth set of symbols and the seventh set of symbols when the slide window is applied to the portion of the second frame;
determine a second absolute squared value of the second cross correlation when the slide window is applied to the second portion of the second frame; and
aggregate the first absolute squared value of the cross correlation and the second absolute squared value of the second cross correlation.

21. The apparatus of claim 17, wherein to determine the starting location of the second frame header by identifying the peak value associated with the cross correlation of the fifth set of symbols and the seventh set of symbols, the receiver is operable to:
identify a highest value of the cross correlation of the fifth set of symbols and the seventh set of symbols;
determine that the highest value satisfies a threshold level;
determine a position of a symbol corresponding to the highest value in response to determining that the highest value satisfies a threshold level; and
determine the position of the symbol corresponding to the highest value as a starting position of the second frame header.

* * * * *